US008010329B2

(12) United States Patent
Kallenbach

(10) Patent No.: US 8,010,329 B2
(45) Date of Patent: Aug. 30, 2011

(54) COMPUTER-IMPLEMENTED SYSTEM AND METHOD FOR DESIGNING A PRESSURE-DOSED DRAIN FIELD

(75) Inventor: Thomas J. Kallenbach, Bozeman, MT (US)

(73) Assignee: Kallenbach, Inc., Belgrade, MT (US)

( * ) Notice: Subject to any disclaimer, the term of this patent is extended or adjusted under 35 U.S.C. 154(b) by 755 days.

(21) Appl. No.: 11/868,670

(22) Filed: Oct. 8, 2007

(65) Prior Publication Data

US 2009/0094002 A1 Apr. 9, 2009

(51) Int. Cl.
*G06G 7/50* (2006.01)
(52) U.S. Cl. ....... 703/9; 137/625.47; 137/367; 210/620; 210/143; 210/151; 210/615
(58) Field of Classification Search ........................ 703/9
See application file for complete search history.

(56) References Cited

U.S. PATENT DOCUMENTS

| | | | |
|---|---|---|---|
| 5,063,505 A | 11/1991 | Pate et al. | |
| 6,556,924 B1 | 4/2003 | Kariyawasam et al. | |
| 2003/0236639 A1 | 12/2003 | Curry | |
| 2005/0258106 A1 | 11/2005 | Cape, Sr. | |
| 2007/0012609 A1 | 1/2007 | Zupancie et al. | |

OTHER PUBLICATIONS

Pipe Flow Expert User Guide. Daxesoft Ltd. [online]. Jul. 2006. [retrieved on Mar. 13, 2009]. URL:<http://web.archive.org/web/20060924231044/http://www.pipeflow.co.uk/public/documents/PipeFlowExpertUserGuide.pdf>.*
Sewerage System Standard Practice Manual. [online] Sep. 2006. [retrieved on Mar. 17, 2010]. URL:<http://www.llbc.leg.bc.ca/public/pubdocs/bcdocs/415224/spm20(sept2006)consolidated.pdf>.*
Flow Measurement. [online] Jan. 2005. [retrieved on Mar. 20, 2010]. URL:<http://web.archive.org/web/20050107031055/www.pc-education.mcmaster.ca/Instrumentation/flow.htm>.*
WA Pretorius Dividing-flow manifold calculations with a spreadsheet, ISSN 0378-4738, Water SA vol. 23 No. 2, pp. 147-150 Apr. 1997.*
R. Sanks, Pumping Station Design, 2nd Edition, Chapter 3, pp. 27-53 , Butterworth & Heinemann, Wodurn, MA, U.S.
Office of Water, U.S. Environmental Agency, Onsite Wastewater Treatment Systems Management, 2002, EPA/625/R-00/006, U.S. Environmental Agency, U.S.

* cited by examiner

*Primary Examiner* — Kamini S Shah
*Assistant Examiner* — Cuong V Luu
(74) *Attorney, Agent, or Firm* — Antoinette M. Tease

(57) ABSTRACT

A computer-implemented system for designing a pressure-dosed drain field comprising: a screen that allows a user to specify length and diameter for pipes that comprise the forcemain and discharge assembly, specify the pumping liquid level and discharge elevation, select the number of laterals and enter a specified residual pressure, enter or select a coefficient to be used in calculating friction losses, and enter the diameter and length of each manifold segment; a minor loss screen that calculates minor losses based on fitting selections made by the user; a pump file; a tabulated results screen; a gauge screen; and system and pump curves. A computer-implemented method of using the above system to design a pressure-dosed drain field. The purpose of the system and method is to enable an engineer to design a pressure-dosed drain field that will meet regulatory requirements for the system flow differential.

50 Claims, 13 Drawing Sheets

Tabulated Results

Squirt Pressurized Drainfield Design and Analysis

| | Maximum Orifice Flow Rate (gpm) | Minimum Orifice Flow Rate (gpm) | Orifice Flow Differential (%) | Lateral Flow Rate (gpm) | Manifold Pressure (ft) | Manifold Flow Rate (gpm) | Manifold Headloss (ft) | Residual Pressure (ft) | Orifice Plate Orifice Diameter (in) |
|---|---|---|---|---|---|---|---|---|---|
| Lateral 1 | 1.41 | 1.38 | 2.11 | 16.62 | 10.87 | 16.62 | .33 | 10.00 | NO PLATE |
| Lateral 2 | 1.41 | 1.38 | 2.11 | 16.62 | 12.37 | 33.24 | 1.50 | 10.00 | NO PLATE |
| Lateral 3 | 1.49 | 1.46 | 2.09 | 17.66 | 16.46 | 50.90 | 4.09 | 11.30 | NO PLATE |
| Lateral 4 | 1.73 | 1.70 | 2.04 | 20.48 | 16.46 | 71.38 | 8.92 | 15.20 | NO PLATE |

Flowrate and Total Dynamic Head: 71.38 gpm  49.29 ft

Flow Differential Across System: 25.91 %
Total Lateral Length: 240 ft

Forcemain
Headloss in Forcemain: 14.80 ft
Velocity in Forcemain: 7.29 ft/sec

Pump Discharge
Headloss in Discharge: 18.03 ft
Velocity in Discharge: 12.93 ft/sec Dose volume is 1/7 gal at 5 times lateral volume
Forcemain Volume: 163 gal
Manifold volume: 37 gal

FIGURE 4

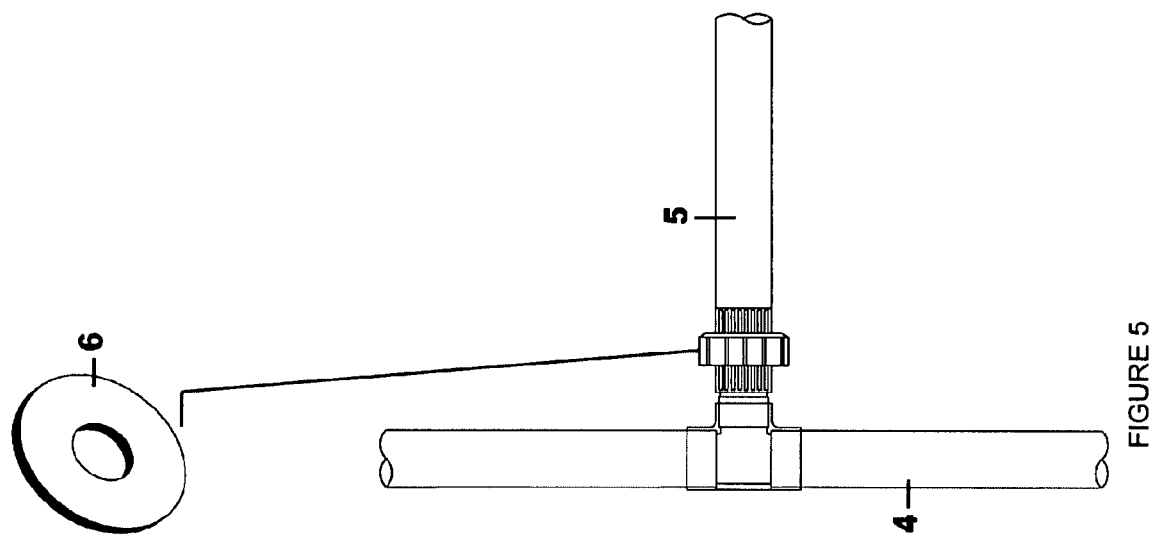

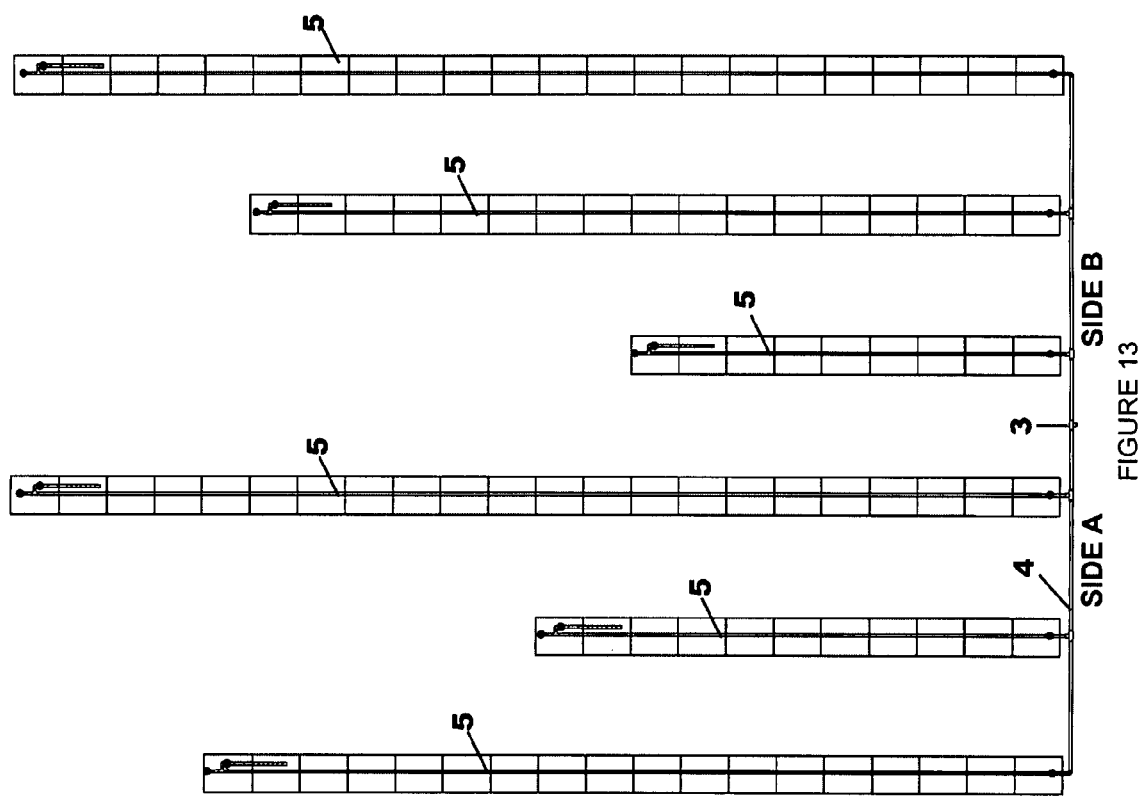

COMPUTER-IMPLEMENTED SYSTEM AND METHOD FOR DESIGNING A PRESSURE-DOSED DRAIN FIELD

BACKGROUND OF THE INVENTION

1. Field of the Invention

The present invention relates generally to the field of computer-implemented inventions, and more specifically, to a computer-implemented system and method for designing a pressure-dosed drain field.

2. Description of the Related Art

Pressure-dosed drain fields are typically used for wastewater treatment in connection with homes, clustered communities and commercial developments that are not connected to municipal wastewater treatment plants and for which a gravity drain field is not suitable. A pressure-dosed drain field is one in which the wastewater is discharged through a network of pipes over a certain area. The discharge or "dose" is released through orifices in the piping at timed intervals or according to wastewater production. Regulations typically specify a certain minimum pressure requirement for the most distant (or "distal") orifice in the system and require that the pressure in all of the other orifices in the system may not deviate from the pressure in the distal orifice by more than ten percent (10%). The regulations also typically establish the minimum volume of wastewater that must be delivered into the piping system per dose.

There are several factors that go into designing a pressure-dosed drain field system, including, but not limited to: the type of pump used (the pump is located in the pump chamber, which is located at the septic tank); the length and diameter of the forcemain (which is the pipe that leads from the pump chamber to the drain field); the length and diameter of manifold segments (which connect to the laterals); the number, spacing, length, diameter and elevation of the laterals; and the number, spacing and diameter of the orifices on the laterals. Currently, these calculations are done on spreadsheets and are based on little more than educated guesswork. In fact, it is not uncommon for drain fields to be out of compliance with regulations that require the deviation in pressure of the fluid emanating from the orifices not to deviate by more than 10% of the pressure in the distal orifice. Thus, there is a need for an automated system that would allow engineers to design pressure-dosed drain fields with confidence that the regulatory requirement of relatively even pressure throughout the pressure-dosed drain field system will be met.

The prior art includes computer systems for dealing with various aspects of wastewater treatment systems, but none of these systems provides a mechanism for designing a pressure-dosed drain field. The two patents discussed below deal with wastewater collection, whereas the present invention deals with draining wastewater after it is collected. Out of the three patent applications discussed below, the only one that deals with wastewater dispersal is Zupancic, but Zupancic deals with an entirely different type of wastewater treatment system than the present invention.

U.S. Pat. No. 5,063,505 (Pate et al., 1991) deals with a sewer system where wastewater is collected from homes and buildings and pumped to a treatment plant. A database ascertains the wastewater flow and surface hydraulic grade so that the operators of the plant can determine whether their systems are working. In short, the Pate invention is a system for managing a public wastewater collection system. This invention has nothing to do with pressure-dosed drain fields or designing a wastewater treatment system.

U.S. Pat. No. 6,556,924 (Kariyawasam et al., 2003) describes a computer-implemented system for determining optimal repair options for cast iron and ductile iron water or wastewater pipe sections. The focus of this system is on maintenance, not design. Furthermore, iron pipes generally are not used in pressure-dosed drain fields; therefore, this patent is not relevant to the present invention.

U.S. Patent Application Pub. No. 2007/0012609 (Zupancie et al.) involves subsurface drip irrigation dispersal of sodic water generated as a result of drilling for coal bed methane. The present invention does not involve a drip irrigation system, and the Zupancic system does not involve the same relatively high pressure levels associated with a pressure-dosed drain field. In fact, the Zupancic system has nothing to do with the problem that the present invention solves, namely, the design of a pressure-dosed drain field that provides relatively uniform pressure rates at all of the orifices throughout the system. The problem of maintaining relatively constant pressure throughout the system simply does not exist with the Zupancic drip dispersal system because the drip emitters control the pressure.

U.S. Patent Application Pub. No. 2003/0236639 (Curry) describes a method of analyzing sewer flow in an open channel that is carrying untreated water to a treatment plant. In a pressure-dosed drain field, the pipes are fully pressurized during a dose; therefore, the Curry method is not relevant to the present invention and deals with an entirely different problem.

U.S. Patent Application Pub. No. 2005/0258106 (Cape, Sr.) discloses software that controls the movement of a batch of wastewater through a wastewater treatment device. The present invention, on the other hand, relates to the draining of wastewater after it has been treated; therefore, the Cape invention is not relevant to the present invention.

As is apparent from the above discussion, there is no prior art that deals with the problem of designing a pressure-dosed drain field that will meet regulatory pressure requirements to a very high level of accuracy. Accordingly, there is a need for a system and method that allows engineers to design wastewater treatment systems—and more specifically, pressure-dosed drain flelds—for homes, clustered communities and commercial developments that are not connected to municipal wastewater treatment plants and that, for a variety of reasons, cannot be served by standard septic tank/gravity-dosed drain field combinations. Ideally, the system would provide engineers with confidence that the systems they design will be in compliance with regulatory requirements for the minimum pressure at the distal orifice and the establishment of relatively constant pressure throughout all of the orifices in the system.

BRIEF SUMMARY OF THE INVENTION

The present invention is a computer-implemented system for designing a pressure-dosed drain field, wherein a user uses the system to design a pressure-dosed drain field, comprising: a screen that allows a user to specify length and diameter for pipes that comprise the forcemain and discharge assembly; a minor loss screen that calculates minor losses based on fitting selections made by the user; a screen that allows the user to specify pumping liquid level and discharge elevation; wherein the drain field designed by the user will have a number of laterals, wherein the number of laterals comprises a first lateral, and wherein the first lateral comprises a distal orifice, a screen that allows the user to select the number of laterals and enter a specified residual pressure for the distal orifice of the first lateral; a screen that allows the user to enter or select a coefficient to be used in calculating friction losses in the laterals, manifold, forcemain and pump discharge assembly; wherein the manifold comprises segments, wherein the number of manifold segments is determined by the number of laterals entered by the user, wherein each segment has a diameter and length, wherein the laterals are spaced a certain distance apart from one another, and wherein the spacing between manifold segments determines the spacing between the laterals, a screen that allows the user to enter the diameter and length of each manifold segment; a pump file that comprises a list of pumps and a window that displays a list of the pumps in the pump file; wherein each lateral comprises a plurality of orifices, wherein the space between each orifice on a given lateral defines a lateral segment, wherein each lateral segment has a diameter and length, and wherein each lateral has an elevation, a grid that indicates, for each lateral, orifice diameter, orifice spacing, diameter and length of each lateral segment, and the elevation of the lateral, wherein each of the values displayed in the grid is modifiable by the user; and a tabulated results screen that shows, for each lateral, maximum and minimum orifice flow rate, orifice flow differential, lateral flow rate, total lateral head loss, manifold flow rate, manifold head loss, and pressure at the distal orifice of each lateral; wherein the system automatically calculates flow differential across the pressure-dosed drain field designed by the user and displays the flow differential on the tabulated results screen.

In a preferred embodiment, the screen on which the user specifies length and diameter for pipes that comprise the forcemain and discharge assembly, the screen that allows the user to specify pumping liquid level and discharge elevation, the screen that allows the user to enter the number of laterals and enter a specified residual pressure for the distal orifice on the first lateral, the screen that allows the user to enter or select a coefficient to be used in calculating friction losses, and the screen that allows the user to enter the diameter and length of each manifold segment are all a single main screen. Preferably, the pump file and grid are also displayed on the main screen.

In a preferred embodiment, the flow differential across the pressure-dosed drain field designed by the user is the difference in flow rates between the minimum flow rate orifice and the maximum flow rate orifice across all laterals. Preferably, the system determines whether an air release valve is needed based on discharge elevation, and if so, informs the user of the need for an air release valve. Preferably, each pump included in the pump file has a pump performance curve (or pump curve) that reflects the pressure that is generated by the pump at a given flow rate.

In a preferred embodiment, the minor loss screen displays graphically a plurality of fittings used in piping systems, each fitting has a type, the pressure-dosed drain field designed by the user comprises a number of fittings, the user selects on the minor loss screen the type and number of fittings for the forcemain and discharge assembly, the system calculates minor losses for the forcemain and discharge assembly, and the calculated minor losses are displayed on a screen. Preferably, the pressure-dosed drain field designed by the user has an overall flow rate and a total dynamic head, the system calculates the overall flow rate and the total dynamic head, and the overall flow rate and the total dynamic head are reflected on the tabulated results screen. Preferably, the system calculates head loss, velocity and volume for the forcemain, head loss and velocity for the discharge assembly, and dose volume, and these values are reflected on the tabulated results screen.

In a preferred embodiment, the system determines whether an orifice plate is needed for any given lateral based on elevation differences between the laterals, the tabulated results screen includes an orifice plate column, and the system indicates orifice plate diameter required for each lateral in the orifice plate column of the tabulated results screen.

In a preferred embodiment, the system further comprises a gauge screen, wherein the system calculates system flow differential, lateral differential, residual pressure at the distal orifice of the first lateral, forcemain velocity, forcemain head loss, discharge velocity, and discharge head loss, and wherein these values are shown on the gauge screen in the form of a plurality of gauges. Preferably, each gauge comprises a yellow zone, a green zone and a red zone to indicate to the user whether the calculated values are within acceptable ranges. Preferably, the zones are preset or specified by the user.

In a preferred embodiment, the system generates a system curve, and the system curve is a graphic representation of pressure versus flow for the pressure-dosed drain field designed by the user. Preferably, the pressure-dosed drain field designed by the user has an overall flow rate and a total dynamic head, the system calculates the overall flow rate and the total dynamic head, the overall flow rate and the total dynamic head are reflected on the tabulated results screen, the system plots a point equal to the overall flow rate and total dynamic head from the tabulated results screen on a graph, said point is a point on a system curve, and the system calculates overall flow rates and total dynamic head based on different assumed values for the residual pressure at the distal orifice of the first lateral to generate additional points on the system curve.

In a preferred embodiment, the system examines the pump file to determine if at least one pump that provides a pressure-flow combination that lies somewhere along the system curve when the pump is within a certain range of its best efficiency point and plots a pump curve for the pump on the same graph as the system curve. Preferably, the range is based on either default criteria or criteria entered by the user. Preferably, the system allows the user to manually select pump curves to be plotted on the same graph as the system curve.

In a preferred embodiment, there is a point at which the system curve intersects with each pump curve, the intersection point is referred to as the operating point, and the system calculates residual pressure at the distal orifice of the first lateral for each operating point. Preferably, the user takes the residual pressure calculated by the system for the operating point and changes the specified residual pressure so that it equals the residual pressure calculated by the system for the operating point, and the values reflected on the tabulated results screen are recalculated so that they are consistent with the operating point. Preferably, the system further comprises a gauge screen that shows the values reflected on the tabulated results screen in gauge format, and when the user changes the specified residual pressure so that it equals the residual pressure calculated by the system for the operating point, the values shown on the gauge screen are recalculated so that they are consistent with the operating point.

In a preferred embodiment, the system accommodates end manifold configurations, central manifold configurations, and symmetric and asymmetric pitchfork manifold configurations for the pressure-dosed drain field.

The present invention is also a computer-implemented method for designing a pressure-dosed drain field, wherein a user uses the method to design a pressure-dosed drain field, comprising: providing a screen that allows a user to specify length and diameter for pipes that comprise the forcemain and discharge assembly; providing a minor loss screen that calculates minor losses based on fitting selections made by the user; providing a screen that allows the user to specify pumping liquid level and discharge elevation; wherein the drain field designed by the user will have a number of laterals, wherein the number of laterals comprises a first lateral, and wherein the first lateral comprises a distal orifice, providing a screen that allows the user to enter the number of laterals and enter a specified residual pressure for the distal orifice of the first lateral; providing a screen that allows the user to enter or select a coefficient to be used in calculating friction losses in the laterals, manifold, forcemain and pump discharge assembly; wherein the manifold comprises segments, wherein the number of manifold segments is determined by the number of laterals entered by the user, wherein each segment has a diameter and length, wherein the laterals are spaced a certain distance apart from one another, and wherein the spacing between manifold segments determines the spacing between the laterals, providing a screen that allows the user to enter the diameter and length of each manifold segment; providing a pump file that comprises a list of pumps and a window that displays a list of the pumps in the pump file; wherein each lateral comprises a plurality of orifices, wherein the space between each orifice on a given lateral defines a lateral segment, wherein each lateral segment has a diameter and length, and wherein each lateral has an elevation, providing a grid that indicates, for each lateral, orifice diameter, orifice spacing, diameter and length of each lateral segment, and the elevation of the lateral, wherein each of the values displayed in the grid is modifiable by the user; providing a tabulated results screen that shows, for each lateral, maximum and minimum orifice flow rate, orifice flow differential, lateral flow rate, total lateral head loss, manifold flow rate, manifold head loss, and pressure at the distal orifice of each lateral; and automatically calculating the flow differential across the pressure-dosed drain field designed by the user and displaying the flow differential on the tabulated results screen.

In a preferred embodiment, the screen on which the user specifies length and diameter for pipes that comprise the forcemain and discharge assembly, the screen that allows the user to specify pumping liquid level and discharge elevation, the screen that allows the user to select the number of laterals and enter a specified residual pressure for the distal orifice on the first lateral, the screen that allows the user to enter or select a coefficient to be used in calculating friction losses, and the screen that allows the user to select the diameter and length of each manifold segment are all a single main screen. Preferably, the pump file and grid are also displayed on the main screen.

In a preferred embodiment, the flow differential across the pressure-dosed drain field designed by the user is the difference in flow rates between the minimum flow rate orifice and the maximum flow rate orifice across all laterals. Preferably, the method further comprises determining the necessity for an air release valve based on discharge elevation and, if an air release valve is needed, informing the user of the need for an air release valve. Preferably, each pump included in the pump file has a pump performance curve that reflects the pressure that is generated by the pump at a given flow rate.

In a preferred embodiment, wherein the minor loss screen displays graphically a plurality of fittings used in piping systems, each fitting has a type, the pressure-dosed drain field designed by the user comprises a number of fittings, and the user selects on the minor loss screen the type and number of fittings for the forcemain and discharge assembly, the method further comprises calculating minor losses for the forcemain and discharge assembly and displaying the calculated minor losses on a screen. Preferably, wherein the pressure-dosed drain field designed by the user has an overall flow rate and a total dynamic head, the method further comprises calculating the overall flow rate and the total dynamic head and including the calculated overall flow rate and total dynamic head on the tabulated results screen. Preferably, the method further comprises calculating head loss, velocity and volume for the forcemain, head loss and velocity for the discharge assembly, and dose volume and reflecting the calculated head loss, velocity and volume for the forcemain, head loss and velocity for the discharge assembly, and dose volume on the tabulated results screen.

In a preferred embodiment, wherein the tabulated results screen includes an orifice plate column, the method further comprises determining whether an orifice plate is needed for any given lateral based on elevation differences between the laterals and indicating orifice plate diameter required for each lateral in the orifice plate column of the tabulated results screen.

In a preferred embodiment, the method further comprises calculating system flow differential, lateral differential, residual pressure at the distal orifice of the first lateral, forcemain velocity, forcemain head loss, discharge velocity, and discharge head loss and showing the calculated system flow differential, lateral differential, residual pressure, forcemain velocity, forcemain head loss, discharge velocity, and discharge head loss on a gauge screen in the form of a plurality of gauges. Preferably, each gauge comprises a yellow zone, a green zone and a red zone to indicate to the user whether the calculated values are within acceptable ranges. Preferably, the zones are preset or specified by the user.

In a preferred embodiment, the method further comprises generating a system curve that is a graphic representation of pressure versus flow for the pressure-dosed drain field designed by the user. Preferably, wherein the pressure-dosed drain field designed by the user has an overall flow rate and a total dynamic head, the method further comprises calculating the overall flow rate and the total dynamic head and including the calculated overall flow rate and total dynamic head on the tabulated results screen, plotting a point equal to the overall flow rate and total dynamic head from the tabulated results screen on a graph, wherein said point is a point on a system curve, calculating overall flow rates and total dynamic head based on different assumed values for the residual pressure at the distal orifice of the first lateral, and plotting the calculated overall flow rates and total dynamic head based on the different assumed values for the residual pressure at the distal orifice of the first lateral as additional points on the system curve.

In a preferred embodiment, the method further comprises examining the pump file to determine if at least one pump that provides a pressure-flow combination that lies somewhere along the system curve when the pump is within a certain range of its best efficiency point and plotting a pump curve for the pump on the same graph as the system curve. Preferably, the range is based on either default criteria or criteria entered by the user. Preferably, the user manually selects pump curves to be plotted on the same graph as the system curve.

In a preferred embodiment, wherein there is a point at which the system curve intersects with each pump curve, and wherein the intersection point is referred to as the operating point, the method further comprises calculating residual pressure at the distal orifice of the first lateral for each operating point. Preferably, wherein the user takes the calculated residual pressure for the operating point and changes the specified residual pressure so that it equals the calculated residual pressure for the operating point, the method further comprises recalculating the values reflected on the tabulated results screen so that they are consistent with the operating point. Preferably, the method further comprises providing a gauge screen that shows the values reflected on the tabulated results screen in gauge format and recalculating the values shown on the gauge screen so that they are consistent with the operating point.

In a preferred embodiment, the method accommodates end manifold configurations, central manifold configurations, and symmetric and asymmetric pitchfork manifold configurations for the pressure-dosed drain field.

BRIEF DESCRIPTION OF THE DRAWINGS

FIG. 4 is a screen shot of the tabulated results screen of the present invention.

FIG. 5 is a perspective view of an orifice plate.

FIG. 13 is an illustration of an asymmetric pitchfork manifold configuration.

REFERENCE NUMBERS

Figure 1:
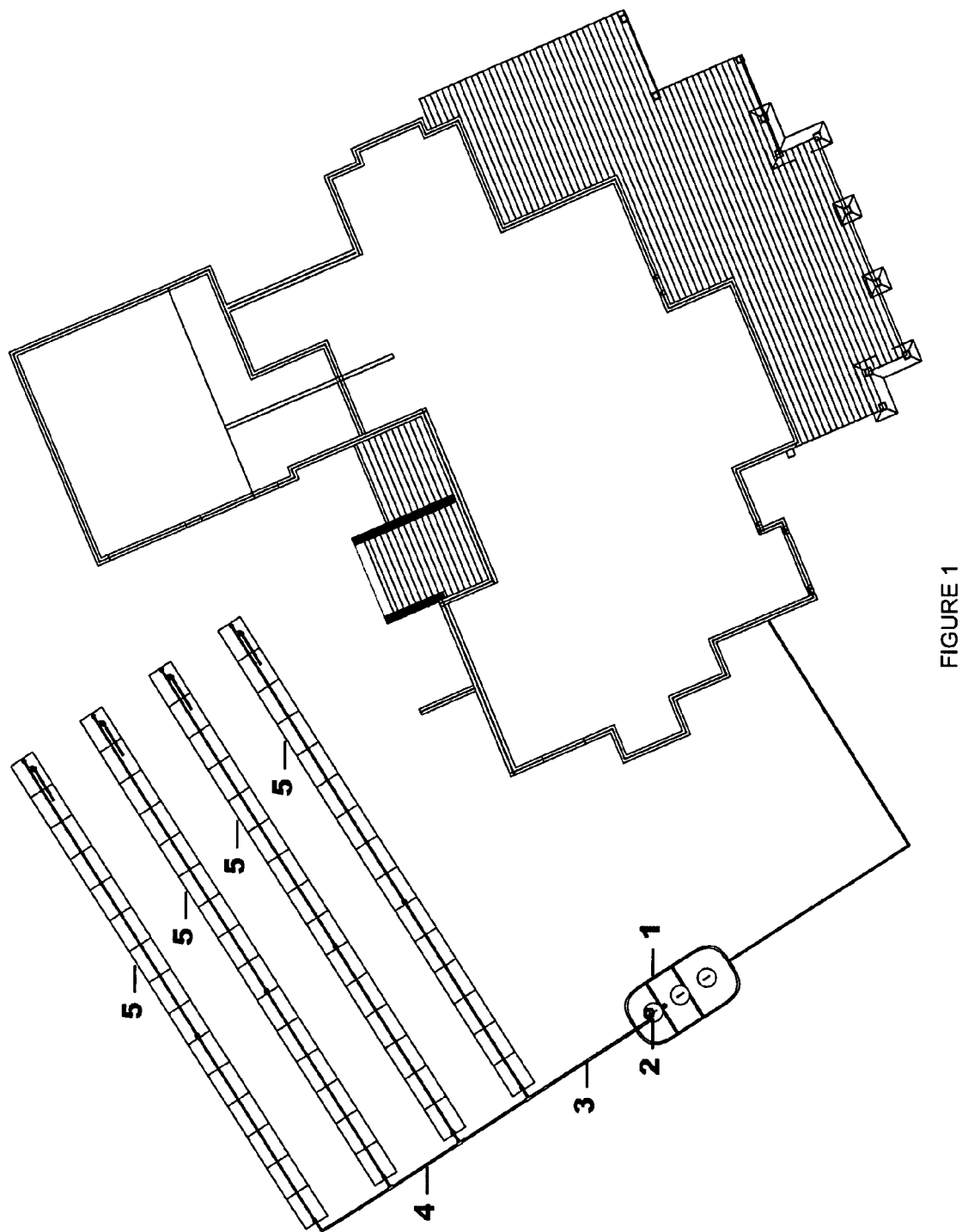
FIG. 1 is an illustration of the various components of a typical onsite wastewater treatment system with an end manifold configuration.

1 Septic tank
2 Pump chamber
3 Forcemain
4 Manifold
5 Lateral
6 Orifice plate

DETAILED DESCRIPTION OF INVENTION

A. Overview

The present invention is a specialized hydraulic analysis program used to design wastewater treatment systems (specifically, pressure-dosed drain fields) for homes, clustered communities and commercial developments that are not connected to municipal wastewater treatment plants. Nationwide, an increasing amount of land development is occurring outside city limits, where the former trend of "piping" wastewater to a centralized treatment facility is not practical. Currently, more engineers and developers are relying upon smaller point-of-use, "decentralized" or "onsite" wastewater treatment systems. These smaller, more customizable systems are often used in conjunction with a special type of wastewater discharge distribution system called a pressure-dosed drain field.

The United States Environmental Protection Agency (EPA), as well as state and local environmental health departments across the country, is particularly concerned with decentralized systems' methods of wastewater discharge, as well as the quality of the wastewater effluent being discharged. Such decentralized systems are often situated in environmentally sensitive areas located outside of city limits and are subject to strict treatment and monitoring standards. Historically, "onsite" systems were simply buried and forgotten; conventional septic tank/gravity-dosed drain field combinations were left unattended and often malfunctioned at the expense of the surrounding environment and public health. This pervasive problem has resulted in many state regulatory agencies imposing far more stringent treatment standards on decentralized systems. As a common element of many decentralized systems, pressure-dosed drain fields also are subject to these stricter standards. The present invention is designed to be a valuable tool in meeting such standards.

Typically, wastewater can be discharged to one of two locations: land or surface water. Securing surface water discharge permits can be difficult because the treatment standards for such permits are very rigorous. Wastewater must be treated to an exceptionally high degree prior to being discharged to surface water, and the monitoring requirements on surface water discharge systems add considerably to the cost of the facility.

Discharging wastewater to land/soil—while still subject to a strict permitting process—is often a more desirable option because microorganisms present in the soil act as "polishers" in the wastewater treatment process. Wastewater that is treated to a high degree and then is properly discharged to the soil via a pressure-dosed drain field poses virtually no threat to public health or to the environment; therefore, a decentralized system that relies upon a well-designed pressure-dosed drain field for discharge can be an ideal method of wastewater treatment. Many sites that were not formerly considered appropriate for land development can now be developed by using this more sophisticated wastewater treatment technology.

Despite their obvious advantages over gravity drain fields (i.e., more efficient treatment) and the more stringent regulations that govern them, pressure-dosed drain fields are still failing at an alarming rate across the country. Many thousands of onsite wastewater treatment systems fail each year; of those failures, a significant percentage is attributable to improperly designed and calculated pressure-dosed drain fields or the lack of a pressure-dosed drain field altogether. Two common types of failures in pressure-dosed drain fields are: (i) hydraulic overload of the soil, which causes effluent ponds to surface on the ground because the soil cannot absorb the effluent; and (ii) failure of the soil to treat the effluent before it passes through to the groundwater (i.e., the effluent passes through the soil too quickly). The former type of failure is more common on fine soil, silts and clays, and the latter type of failure is more prevalent in coarse soil, sand and gravel. The prevailing cause of improper pressure-dosed drain field design and calculation is the absence of a standardized, reliable and efficient hydraulic analysis program. The present invention fills this need.

One of the primary challenges to using a decentralized system/pressure-dosed drain field combination is designing a pressure-dosed drain field that distributes wastewater consistently and evenly over the designated drain field site. State regulations require that wastewater flow distribution must be uniform and must not vary by more than 10% at any point in the distribution pipe network. This regulation is the industry standard, yet few pressure-dosed drain fields are meeting that standard, to the potential detriment of groundwater, surface water and public health.

The underlying reason for most pressure-dosed drain fields' inability to meet the "10% rule" is that the calculations necessary to accurately characterize the piping network hydraulics are quite complicated. Miscalculation and faulty design typically results in one portion of the drain field becoming oversaturated—to the point where the microorganisms present in the soil are unable to effectively process the wastewater—while leaving another part dry and underutilized. In this situation, overall treatment quality is reduced, and the drain fields have a significantly higher rate of failure.

When a drain field fails, the surrounding environment and waterways may suffer, and the system owner will usually incur substantial expenses repairing the system and regenerating or replacing the drain field entirely. On space-constrained sites, fixing or replacing a failed or malfunctioning pressure-dosed drain field can be next to impossible, as there may be no alternative location for a replacement drain field. In that situation, the current drain field would need to be removed, the soil remediated, and a new drain field installed in the former location. This process is costly and expensive but often done due to the lack of alternatives.

Despite their potential for malfunction, pressure-dosed drain fields arguably remain the best form of land discharge technology for decentralized wastewater treatment systems. In theory, when properly designed, pressure-dosed drain fields are an ideal solution to wastewater discharge/disposal because the soil into which they are installed remains unsaturated, giving natural process time to fully remove contaminants. With the growing trend toward using onsite, decentralized technology in place of municipal treatment plants, the wastewater treatment industry anticipates exponential growth in the number of pressure-dosed drain fields being constructed, not only throughout the United States, but throughout the developed (and developable) world.

Currently, because no advanced software is commercially available to aid engineers/system designers in completing the complex calculations inherent in designing pressure-dosed drain fields, many designers rely on rudimentary, unsophisticated programs and spreadsheets that require a lot of guesswork. Even established, experienced experts in pressure-dosed drain field design rely almost exclusively on "best guess" approaches to calculating and designing around friction losses within the system. Countless hours are spent "tweaking" and troubleshooting the system in the field before the correct pressure for the system can be determined.

All too often, when a pressure-dosed drain field is designed and constructed with methods incapable of performing complete and accurate calculations, the actual operation in the field of the pressure-dosed drain field display s a non-uniform discharge across the field, resulting in localized hydraulic overloading of the soil. This soil overload results in effluent being moved through the soil under saturated conditions. Because a porous medium's saturated hydraulic conductivity is generally several orders of magnitude greater than its unsaturated hydraulic conductivity, the effluent travels through the soil much faster under saturated conditions. Furthermore, if the soil becomes saturated, air is unavailable to natural microorganisms, resulting in far less effective treatment due to anaerobic conditions created by a lack of oxygen. To remedy the defective drain field, pumps must be replaced, laterals, orifice diameters and manifold length and diameters must be reexamined, and, in worst case scenarios, the entire drain field must be redesigned. In many cases, the problem is ignored and the defective drain field left as is in order to avoid the expense and hassle of remedying the defects—to the ultimate detriment of property owners and the environment.

Not only does the lack of a sophisticated pressure-dosed drain field design program hinder proper design and construction on permitted drain fields, but this lack presents major limitations to land development in general. Land development permits are frequently denied based on engineers submitting unsatisfactory wastewater treatment system designs for their clients. Moreover, many engineers/designers assume that land that is not suitable for the basic type of drain field they can calculate and design using a spreadsheet and/or ultra-simplistic software is land that cannot be developed. Increasingly, the lack of a suitable location for a wastewater treatment system is one of the primary justifications used in denying developers permits to develop their land.

In many instances, a given site may be perceived by developers and/or regulators as having only a single location that is available for a wastewater treatment system. A large component (often the largest component) of many decentralized systems is the pressure-dosed drain field. Not only does the location for the drain field need to be sufficiently large; it needs to be a certain distance (dictated by environmental health departments nationwide) from any body of water, a certain distance from any well, and the location must have suitable soil types for wastewater discharge. Under current technology, these constraints limit the options available to developers insofar as the location of the pressure-dosed drain field is concerned.

Environmental regulations, strict as they may be, are not as limiting as the constraints engineers/designers encounter using their current pressure-dosed drain field calculation/design tools. Presently, the few commercially available programs that claim to aid in pressure-dosed drain field design have gross shortcomings when used in real-world applications. For instance, the most prevalent pressure-dosed drain field design program—produced by Orenco Systems Inc. of Sutherlin, Oreg.—only allows for drain field design on a completely flat surface. A perfectly flat surface is a rarity on many building sites; such a flat area would often be more valuable and desirable for use as a home or business construction site rather than as a drain field site.

Moreover, Orenco's program only allows a designer to calculate a single manifold configuration and restricts input values by allowing the user to only select from program supplied values. Additionally, Orenco's program dictates that all laterals must be precisely the same length, with precisely the same orifice diameter and precisely the same orifice spacing, without exception. Every land development has its own unique contours and slopes, land and soil features, and natural limitations. Orenco's "one size fits all" approach simply cannot meet the necessary standards on every site—or on any site, for that matter.

In addition, Orenco's program falls short in the area of pump selection (the pump that pressurizes the drain field by forcing water through the manifold(s), laterals and orifices). Orenco's pump selection requires the user to read through pump curves to find a suitable pump, whereas the present invention automatically selects pumps meeting the user's requirements. Furthermore, Orenco's program does not allow pumps to be added and considered in the design process. The only pump curves Orenco's program offers for consideration are pumps that are sold by Orenco, which drastically reduces the number of pump options from which a designer may select. Perhaps the most significant flaw in the Orenco program is its inability to calculate the hydraulic response of each element of the drain field. Essentially the Orenco program completes calculations for only one lateral and then simply multiplies those results by the number of laterals. This method produces incorrect results, which usually do not become apparent to the designer until the system is field-tested.

The present invention offers much more flexibility in pressure-dosed drain field design configurations and pump selection options than anything currently on the market. Using the present invention, a designer can select from multiple manifold configurations (rather than just one) and utilize many laterals (far more than the eight-lateral limit imposed by Orenco's program), and the designer can also select from a multitude of pumps from different manufacturers. The designer can also add pumps to the pump file. Moreover, the present invention completes the exhaustive calculations necessary to design sloping drain fields (i.e., drain fields in which the laterals are situated in different elevations) and drain fields with more complex "pitchfork" configurations. The present invention also produces dynamic system curves and various charts that can be printed and submitted to regulatory agencies. Set-up and calculation for a one- to 20-lateral system takes minutes versus hours for a spreadsheet or water distribution program.

There are many sophisticated hydraulic analysis programs available to the engineer, but they are designed for water distribution system analysis, which is functionally very different than pressure-dosed drain field design and analysis. Examples include KY Pipe from KY Pipe LLC of Lexington, Ky.; WaterCAD from Bentley Systems, Incorporated of Watertown, Conn.; and EPANET, which is produced by the EPA. While it is possible to "coax" a water distribution program into performing the appropriate calculations, the task is involved and cumbersome. Generally, therefore, the results are suspect because there is no clear method of conducting the analysis. These programs require that flow rates be specified at "nodes," and since a pressure-dosed drain field is a piping network with many orifices (nodes/points of discharge), the engineer must specify flow at each orifice. The program then simply calculates pressures according to the specified flow. This is adequate for a water distribution system where the question is "can the piping network supply a given demand"; however, it is not correct for a pressure-dosed drain field where the question is whether the 10% rule is met at the regulatory required minimum pressure for the distal orifice.

The present invention requires only one pressure/flow specification for the most distant (or distal) orifice. The program then computes each orifice discharge across the entire pipe network based upon that single specification. It is important to note that each lateral and piping section is analyzed individually with a recursive iterative algorithm. This method makes the present invention enormously flexible and useful to the design engineer. Previously, a single lateral which was an exact duplicate of every other lateral, was calculated and then the results were added together. This method does not produce correct results, and many pressure-dosed drain fields do not meet the 10% rule even though a hydraulic analysis showing compliance was provided.

In addition to providing numerous advantages to engineers/designers of pressure-dosed drain fields, the present invention represents a powerful diagnostic tool for maintenance providers because the correct operating conditions can be calculated and compared to field observations. The present invention has the ability to accommodate any number of laterals from one to a maximum limit determined by the user's available computer memory. It also allows for variable lateral lengths within a system; laterals can be designed to fit physical or legal constraints, thereby filling the entire available area. The invention allows for variable lateral diameters across the system. It also allows for variable lateral diameters on individual laterals, which can be useful for managing friction losses on long laterals. The invention provides for variable lateral elevations, in which case calculations are completed with consideration of actual site topography, resulting in less site disturbance.

The present invention allows for variable orifice spacing and variable orifice diameter across the system, which is useful for designing systems where soil properties are not uniform across the drain field area. The invention allows for variable manifold section length and diameter, which is useful for tailoring the piping network to a variety of site conditions. The invention also allows for variable manifold configurations, including central, pitchfork and end and combinations of the foregoing. In addition, the invention includes a fully selectable pipe fitting selection tool, which automatically adds fitting minor losses to the system and includes them in the calculation.

The present invention provides for automatic system flow-pressure curve generation and automatic pump selection based on user-specified operating conditions or default search criteria. The invention instantly provides pump and system curves meeting specified criteria. The invention automatically identifies pumps that operate closest to their best efficiency point given the system design. The invention generates an automatic solution to pump and system operating point, given the required residual pressure to achieve the operating point.

The present invention can be web-based downloadable or web-based non-downloadable software, or it can be installed on a user's computer other than by downloading over the Internet. In a preferred embodiment, the present invention embodies standard Windows features, such as file operations and an integrated html "Help" system. These and other features of the present invention are discussed more fully below.

B. Description of Standard Onsite System

In general, an onsite wastewater treatment system includes the following components: (1) septic tank; (2) pump chamber; (3) forcemain; (4) manifold; and (5) laterals. FIG. 1 is an illustration of the various components of a typical onsite wastewater treatment system. Wastewater from the home (or business) enters the septic tank 1, where solids settle to the bottom, and fats, oil and great float to the top of the liquid surface. A middle layer, referred to as "clarified effluent," forms. Depending on the degree of treatment required, several options are available for managing the clarified effluent. It can simply flow out of the septic tank and into a drain field, or it may be subjected to additional treatment, such as biological nutrient reduction or aeration in a basin.

The pump chamber 2 houses one or more pumps and allows effluent to collect until a predetermined liquid level is reached. At that point, a liquid level switch (usually a float switch) energizes the pump, which discharges effluent through the pump discharge assembly piping (the forcemain) into the manifold and pressurizes each lateral. The pump in the pump chamber can also be controlled with a timer so that doses are delivered to the drain field at timed intervals.

The forcemain 3 is the main transport pipe between the pump and drain field. It carries the entire drain field flow under pressure; therefore, its hydraulic properties are significant because it may represent a significant pressure loss element. The forcemain connects to the manifold 4. The manifold is a branching element with flow being distributed to each of the laterals. Flow rate decreases along the manifold because it is being divided among laterals.

A lateral 5 is the component responsible for the discharge of effluent from the system. Residential onsite wastewater treatment systems generally have between three and six laterals; larger systems may have 50 or more laterals. A lateral is a pipe, usually made of polyvinyl chloride (PVC), with a diameter between one and six inches. Laterals are connected to the manifold 4 at one end and capped at the other end. A series of small holes, referred to as orifices, is drilled in the crown of the lateral at a specified spacing and of a specified diameter. A common lateral schedule might be a 1½-inch diameter lateral with 3/16-inch diameter orifices spaced at four-foot intervals. When the lateral becomes pressurized, effluent will "squirt" from each orifice.

It is the discharge from each orifice that must comply with the 10% rule. In other words, no discharge from any two orifices in the entire system may vary from one another by more than 10%. The purpose of this rule is to ensure that the soil is being loaded below its saturation point, where the greatest treatment efficiency is possible, and uniformly across the entire area. Engineers responsible for drain field design are required to submit a hydraulic analysis of the piping network demonstrating compliance with the 10% rule. This analysis, for all but the most elementary systems, is usually incomplete and often incorrectly states that the discharge is uniform across the system.

In the past, pressurized drain fields were designed using charts and tables. The EPA provided a number of such charts and tables in its 1980 publication entitled "Onsite Wastewater Treatment." Engineers and various other organizations have also published papers related to the use of tables to calculate drain field hydraulics. As computers became common, the charts and tables were adapted to spreadsheets such as LOTUS®, QUATTRO® and EXCEL®. The spreadsheet solutions, however, carried with them many of the "rules of thumb" or simplified assumptions utilized in the tables, resulting in imprecise calculations.

The effect of the inaccurate calculations becomes obvious during the field test of the system. To test the drain field, the contractor leaves the pipes exposed and fills the pump chamber with clean water. The pump is energized, and the piping network is filled and pressurized. Laterals are oriented with the orifices pointing upward so that the discharge from the entire system can be observed. If the calculations are correct, the spray height at each orifice will roughly equal the spray height from all other orifices. In practice, however, this is often not the case, and the system is simply buried and forgotten. The need exists for an accurate, fast and reliable method of calculating drain field hydraulics as a vital step toward protection of water resources.

C. Examples

The following examples describe how the present invention is used to design a pressure-dosed drain field.

Figure 2:
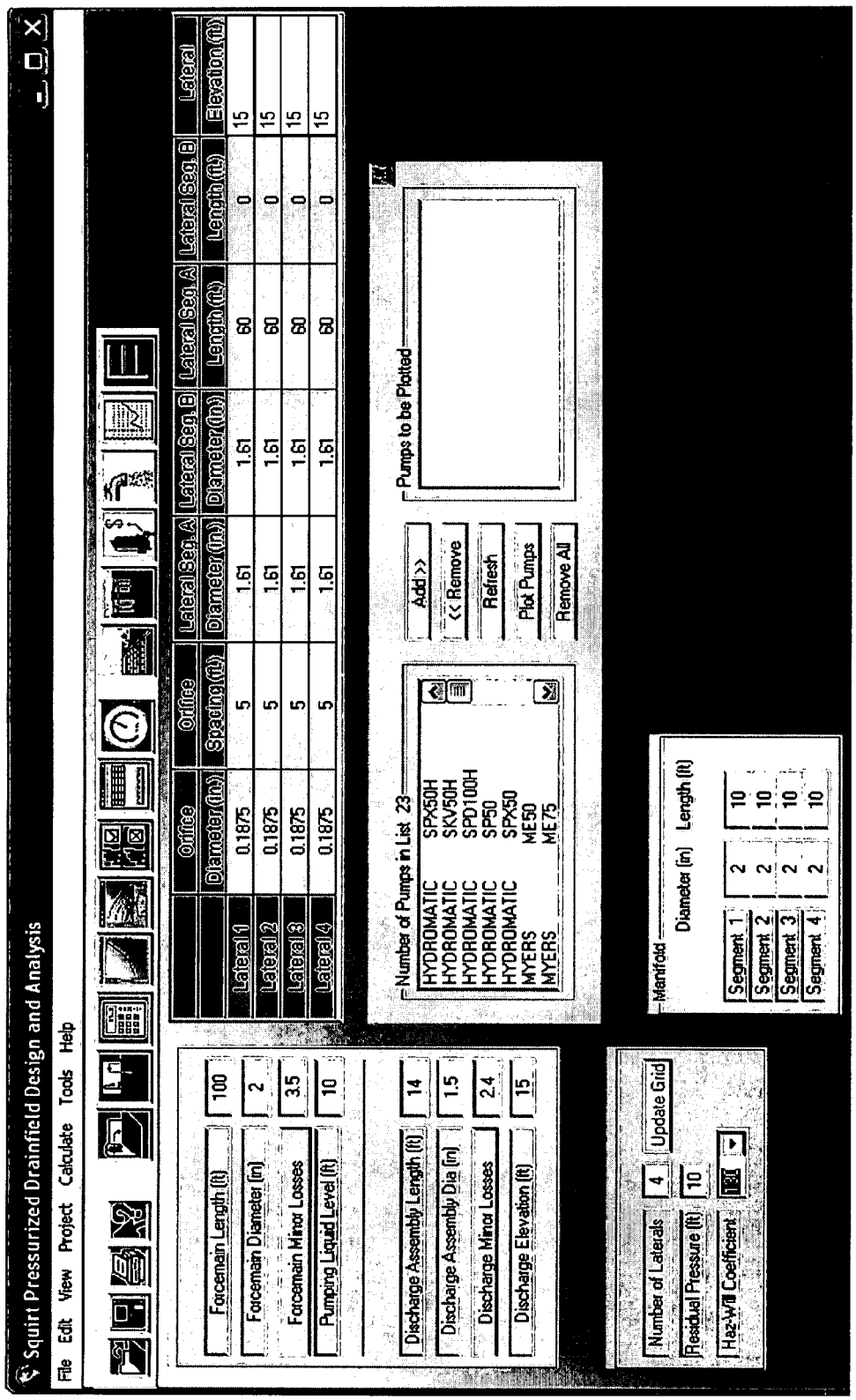
FIG. 2 is a screen shot of the main screen of the present invention.

FIG. 2 is a screen shot of the main screen, where the user specifies the length and diameter for the forcemain and pump discharge assembly pipes. The discharge assembly is a combination of pipe and pipe fittings connected directly to the pump and forcemain. The discharge assembly connects the pump to the forcemain.

In an alternate embodiment, the user could draw the pipe system directly on the screen using a CAD (computer-assisted design) area. The program would track the length and connection location of each pipe and provide the user with pop-up screens to define the remaining pipe parameters.

By clicking on "Forcemain Minor Losses" or "Discharge Minor Losses" on the main screen, the user can pull up a minor loss screen (FIG. 3) that will include components contributing to minor losses and calculate the minor losses in the forcemain and discharge assembly based on fitting selections made by the user. Minor losses are pressure losses due to friction caused by transitions in the pipeline, such as bends, branches, contractions, etc. These losses can be significant and must be factored into the analysis. Minor losses are calculated with a "minor loss coefficient" (k) according to known methods [1]. The minor loss coefficients are added and multiplied by the velocity head of the fluid being pumped. This gives a pressure (h), which is interpreted as a loss. This calculation is represented by the following formula:

$$h = k * v^2/(2*g)$$

where:
  h=pressure;
  k=minor loss coefficient;
  v=velocity;
  $v^2/(2*g)$=velocity head; and
  g=gravitational constant.

Because the minor loss coefficient is a function of pipe diameter (among other things), the invention automatically reads the pipe diameter and calculates the appropriate coefficient based on the type of fitting and fitting diameter.

Figure 3:
FIG. 3 is a screen shot of the minor loss screen of the present invention.

FIG. 3 is a screen shot of the minor loss screen, which displays graphically the most common fittings used in piping systems. The user selects the type and number of fittings for the forcemain and discharge assembly (in a preferred embodiment, there is one minor loss screen for the forcemain and one minor loss screen for the discharge assembly), and the system calculates the minor losses for the forcemain and discharge assembly according to the equation disclosed above and reflects this information on the main screen (see FIG. 2).

Referring to FIG. 2, the pumping liquid level is the elevation of the liquid in the pump chamber, and the discharge elevation is the highest elevation in the forcemain. These values are entered by the user from the main screen. The pumping liquid level is taken into consideration by the program in calculating the total dynamic head, and the discharge elevation is used to determine whether an air release valve is needed in the high point of the forcemain. An air release valve would be needed if air might collect in a high spot in the line, thereby creating more friction loss than it would if it were full of water. If the program determines that an air release valve is needed, a pop-up window will inform the user of the need for an air release valve.

From the main screen, the user also enters the number of laterals and the residual pressure at the distal orifice. In this context, the distal orifice is the orifice that is farthest from the manifold on any given lateral. As used herein, the term "residual pressure" means the pressure at the distal orifice on the first lateral. The "specified residual pressure" means the residual pressure entered by the user on the main screen.

The main screen also includes a "coeffiecient" field. In this field, the user can enter or select a Hazen-Williams coefficient. Optionally, on another screen (not shown), the user can also either enter a Darcy-Weisbach friction factor or choose to allow the program to calculate a Darcy-Weisbach friction factor based on the Hazen-Williams coefficient entered by the user on the main screen. These coefficients are used to calculate the friction losses in a straight and closed conduit, in contrast to the minor loss coefficients, which measure pressure losses due to friction caused by transitions in the pipeline. The Hazen-Williams equation is:

$$hf = 4.727 * L/((D/12)^{4.87}) * (Q/(449*C))^{1.85}$$

where:
- hf=head loss due to pipe friction (ft);
- L=pipe length (ft);
- D=pipe diameter (in);
- Q=flow rate (gal/min); and
- C=Hazen-Williams coefficient.

The Darcy-Weisbach equation is:

$$hf = f*L*v^2/(D*2*g)$$

where:
- hf=head loss due to pipe friction (ft);
- f=friction coefficient;
- L=pipe length (ft);
- v=fluid velocity (ft/sec);
- D=pipe diameter (ft); and
- G=gravitational constant (32.174 ft/sec^2).

The user also enters the diameter and length of each manifold segment from a manifold screen. The number of manifold segments is determined by the number of laterals entered by the user. In the current embodiment, manifold segment 1 is the segment that is most distance from the pump chamber, and manifold segment 4 is the segment that is closest to the pump chamber. The spacing between manifold segments determines the spacing between laterals. The invention allows users to individually define (by length and diameter) each manifold segment, which allows, for example, laterals to be clustered together along the manifold with a certain distance between them. Manipulating manifold length and diameter also allows the incorporation of absorption beds, elevated sand mounds, and sand filters in the overall design because it allows laterals to be clustered together or spread out, and it also allows friction losses to be reduced along sections of the manifold. This would be useful if the drain field is to be installed in a landscaping berm, a feature common to land development projects.

The main screen also comprises a pump window. Each pump has a pump performance curve that reflects the pressure that is generated by a particular pump at a given flow rate (or the flow that is generated at a particular pressure level). In a preferred embodiment, the system allows users to add pumps to the pump window by selecting "Add Pump to File" from a drop-down menu. In a preferred embodiment, the list of pumps shown in the pump window on the main screen is not limited to pumps offered by a single manufacturer.

The main screen also includes an "update grid" button which allows the user to resize the input grid based on the number of laterals being analyzed. The update grid button also automatically updates the number of manifold sections with the correct number of manifold sections for the user-defined manifold configuration.

The main screen also includes a grid that indicates, for each lateral, the orifice diameter, orifice spacing, diameter and length of each lateral segment, and elevation of each lateral. In the current embodiment, the invention allows for two lateral segments; if the user enters lengths in both fields (lateral segment 1 and 2), then the invention assumes that there are two segments with different diameters. Although the current embodiment contemplates only two lateral segments, the present invention is not limited to any particular number of lateral segments. Additionally, in the current embodiment, the elevation is the same for all segments in a single lateral, but the invention could be modified to allow for different elevations of different segments within the same lateral.

The user enters these values based on various engineering considerations. For example, increasing the lateral diameter dramatically increases the required discharge volume that must be delivered to the system. The result is that a larger pump chamber will be required to store the additional volume, and there will be less frequent doses of effluent to the drain field. Studies have shown that the optimum drain field dosing regime is small, frequent doses. Additionally, if the lateral diameter is increased, scouring velocities may not be attained, and the laterals may become clogged with biofilm. Thus, the system designer must take into account not only the need to provide uniform orifice discharge but also the additional costs entailed in a larger infrastructure and/or clogged pipe, as well as optimum treatment considerations. All of these factors will weigh into the user's decision as to what values to enter in designing his system, but the invention allows system designers the flexibility to see what effect a change in any one or more of these values will have on the system's ability to meet the 10% rule.

The ability to vary each lateral's orifice diameter and orifice spacing is useful when designing a system that crosses different soil types. Coarse-grained soils, being more permeable than fine-grained soils, require orifices to be more closely spaced to avoid point overloading of the soil. Fine-grained soils function better with greater orifice spacing. Moreover, for a given orifice diameter, lateral discharge increases dramatically as the distance between orifices decreases; therefore, the system designer may choose to decrease the diameter of the more closely spaced orifices to accurately control the lateral discharge rate. Modifications such as these are generally not practical with spreadsheet methods.

In this example, all laterals have the same elevation, are constructed with the same diameter pipe, and have the same orifice diameters and spacing. All manifold sections are the same length and diameter, and the forcemain connects at the end of the piping network (see FIG. 1). The first lateral is the lateral that is most distant from the pump chamber, and the distal orifice is the orifice on the first lateral that is farthest from the manifold. In this example, each lateral has twelve (12) orifices (lateral segment A length divided by orifice spacing length), and the pressure specification at the distal orifice is 10 ft. $H_2O$.

Once the user has selected and/or entered the information from the main screen, the user may view pertinent information for the system he has just designed in the form of a tabulated results screen, a gauge screen, and/or a system curve. An example of a tabulated results screen using the data shown on the main screen in FIG. 2 is provided in FIG. 4.

The tabulated results screen shows, for each lateral, the maximum and minimum orifice flow rate, the orifice flow differential, the lateral flow rate, the total lateral head loss, the manifold flow rate, the manifold head loss, and the pressure at the distal orifice of each lateral. The maximum and minimum orifice flow rates are the maximum and minimum flow rates for the orifices on a particular lateral. The orifice flow differential is the difference between the maximum and minimum orifice flow rates for a particular lateral. The lateral flow rate is the rate of flow needed in a particular lateral to achieve the specified residual pressure. The manifold flow rate is the rate of flow required to supply all of the laterals with flow and maintain the specified residual pressure. Note that the manifold flow rate is equal to the lateral flow rate only for the first lateral. In an end manifold configuration, the flow rate for manifold segment two will be the sum of the flow rates for the first and second laterals, and the flow rate for manifold segment three will be the sum of the flow rates for the first, second and third laterals, etc.

As used herein, the term "head loss" means pressure loss. The total lateral head loss is the total pressure loss for a particular lateral, and the manifold head loss is the total head loss for the manifold.

Table 1 shows how the orifice flow is calculated for a single lateral (in this case, the first lateral) based on the values shown in FIG. 4. The residual pressure is specified by the user (on the main screen) to be 10.00. Starting from that value, the invention calculates an orifice flow in response to the specified residual pressure. It also calculates a segment flow for the lateral segment between the distal orifice and the next orifice (orifice #2 in Table 1) (the "first lateral segment"), which in this case is equal to the flow from the distal orifice.

Once the segment flow is known, the invention calculates the pressure at orifice #2. The pressure at orifice #2 is the sum of the specified residual pressure and pressure loss in the first lateral segment. With that information, the invention calculates the flow at orifice #2. The flow for the segment between orifice #2 and orifice #3 (the "second lateral segment") is the sum of the flows from orifice #1 and orifice #2, and the pressure at orifice #3 is the sum of the specified residual pressure and the pressure losses in the first and second lateral segments. These calculations are continued until pressure and flow values have been generated for the entire length of the lateral (including all orifices). As shown in Table 1, the invention also calculates a percentage increase in flow from one orifice to the next.

10.00 as a starting point for the pressure at the distal orifice on the second lateral is not within a specified range of the pressure at the beginning of the second lateral calculated by using 10.00 as a starting point for the residual pressure on the first lateral, then the invention will adjust the pressure at the distal orifice of the second lateral until the calculated pressure at the beginning of the second lateral based on the pressure at the distal orifice of the second lateral is within a specified range of the calculated pressure at the beginning of the second lateral based on the pressure at the distal orifice of the first lateral. In a preferred embodiment, the specified range is preset at 0.5 ft., but the user can change the specified range.

Next, the invention takes the pressure from the beginning of the second lateral and, taking into account the head loss for segment 2 of the manifold (between the second and third laterals), calculates the pressure at the beginning of the third lateral. The invention assumes a pressure of 10.00 (equal to the specified residual pressure) for the distal orifice on the third lateral, calculates the pressure at the beginning of the third lateral based on that value, and if the two calculated pressures for the beginning of the third lateral (one based on the pressure at the beginning of the second lateral and the other based on the assumed pressure at the distal orifice on the third lateral) are not within a specified range, the invention adjusts the pressure at the distal orifice on the third lateral until the two calculated values for the pressure at the beginning of the third lateral are within a specified range.

TABLE 1

| ORIFICE # | PRESSURE (ft.) | ORIFICE FLOW (gpm) | SEGMENT FLOW (gpm) | SEGMENT HEAD LOSS (ft.) | SUM OF HEAD LOSSES (ft.) | % INCREASE IN FLOW (%) |
|---|---|---|---|---|---|---|
| 1 | 10.00 | 1.38 | 1.38 | 0.00 | 0.0 | 0.0% |
| 2 | 10.00 | 1.38 | 2.75 | 0.00 | 0.0 | 0.0% |
| 3 | 10.01 | 1.38 | 4.13 | 0.01 | 0.0 | 0.0% |
| 4 | 10.01 | 1.38 | 5.51 | 0.01 | 0.0 | 0.1% |
| 5 | 10.03 | 1.38 | 6.89 | 0.02 | 0.1 | 0.1% |
| 6 | 10.05 | 1.38 | 8.26 | 0.03 | 0.1 | 0.3% |
| 7 | 10.08 | 1.38 | 9.65 | 0.04 | 0.1 | 0.4% |
| 8 | 10.13 | 1.38 | 11.03 | 0.05 | 0.2 | 0.6% |
| 9 | 10.18 | 1.39 | 12.42 | 0.07 | 0.2 | 0.9% |
| 10 | 10.25 | 1.39 | 13.81 | 0.08 | 0.3 | 1.2% |
| 11 | 10.33 | 1.40 | 15.21 | 0.10 | 0.43 | 1.6% |
| 12 | 10.43 10.54 | 1.41 | 16.62 | 0.12 | 0.5 | 2.1% |

In this example, Table 1 indicates that in order to end up with 10.00 ft. residual pressure, 10.54 ft. of pressure must be supplied at the front of the lateral (at the manifold end).

The lateral flow rate shown in FIG. 4 for the first lateral is the sum of the orifice flow rates shown in Table 1. In this example, the lateral flow rate for the first lateral is 16.62 gallons per minute (gpm), which means that the flow rate in manifold segment 1 (the segment between the first and second laterals) must also be 16.62 gpm. Based on the information specified by the user as to the manifold segment length and diameter, the invention calculates the pressure loss (head loss) in the manifold and determines what the manifold pressure must be at the beginning of the second lateral.

At this point, the system has generated a pressure at the beginning of the second lateral based on the specified residual pressure. The invention now assumes that the pressure at the distal orifice on the second lateral will be the same as the residual pressure on the first lateral and calculates the pressure back to the beginning of the second lateral. If the calculated pressure at the beginning of the second lateral using These calculations are continued for all laterals until the invention has calculated a pressure at the beginning of the last lateral (i.e., the lateral closest to the pump chamber). This pressure will be equal to the pressure at the beginning of the manifold. Taking head losses into consideration, the invention will then calculate pressures for the forcemain and discharge assembly, which takes us back to the pump.

Referring back to FIG. 4, the residual pressure on the first lateral was specified as 10.00 on the main screen (see FIG. 2). The invention has calculated the pressure at the distal orifice on the second lateral as 10.00, the pressure at the distal orifice on the third lateral as 11.30 and the pressure at the distal orifice on the fourth lateral as 15.20. The invention automatically calculates the flow differential across the system, and in this example, the flow differential across the system is 25.81%, which would not satisfy the 10% rule. However, examination of the orifice flow differential column on FIG. 4 shows an orifice flow differential for Lateral 1 as 2.11%. Methods that calculate only one lateral and simply multiply the results would report that the 10% rule for the example system is met, when in fact there is a 25.81% difference in orifice flow. As used herein, the flow differential across the system is the difference in flow rates between the minimum flow rate orifice and the maximum flow rate orifice. It is that differential that must be under 10% in order to satisfy the regulatory 10% rule.

The tabulated results screen also shows the flow rate and total dynamic head (or pressure) for the entire system, which in this example are 71.38 gpm and 40.14 ft., respectively. The tabulated results screen shows the head loss, velocity and volume for the forcemain, the head loss and velocity for the discharge assembly, and the dose volume. The head losses for the forcemain and discharge assembly are calculated in the same manner as for a lateral segment or manifold segment. The velocities are calculated by dividing the volumetric flow rate (volume/time) by the area of the pipe. The dose volume is calculated by adding the volume of the forcemain, the volume of the manifold, and five to ten times the volume of the laterals. (Regulations typically require that the volume of effluent delivered to the system must equal or exceed the volume of the forcemain piping plus the volume of the manifold piping plus five to ten times the volume of the laterals.) If the flow rate for the overall system is 71.38 gpm and the dose volume is 147 gallons, then it will take a little over two minutes per dose. This information helps engineers decide how big a pump chamber they will need.

The tabulated results screen also includes a column entitled "Orifice Plate." In this example, the invention has not called for any orifice plates because the laterals were all of the same elevation. If the laterals are of different elevations, however, then the invention maintains constant pressure throughout the system by calling for the use of orifice plates (see FIG. 5), which are inserted inside of the piping to restrict the flow of effluent into the lateral and balance the pressure variation caused by elevation differences.

In fact, flat systems also benefit from this feature because on a large, flat system, the pressure losses due to friction in the manifold can add up to the point that it becomes necessary to use unreasonably large and expensive pipe and fittings for manifold construction. Utilization of the orifice plate calculation of the present invention allows the engineer to manage these pressure losses while keeping the pipe diameters minimal. The invention automatically enters the orifice plate calculations if it detects a variation in lateral elevations. To calculate orifice plate diameters for flat systems, the user adds an insignificant elevation difference to one lateral.

The orifice plate is typically a 3/16-inch thick PVC plate that is installed at the union fitting at the connection between the lateral and the manifold. A hole is drilled in the center of the orifice plate according to the diameter calculated by the invention. If different elevations are entered for the laterals from the main screen, then the system shows, on the tabulated results page, the orifice plate diameter required for each lateral.

The formula used to calculate the orifice plate diameter is as follows:

$$M/\rho = K\pi D_o^2 [\rho(p_1-p_2)/8]^{1/2}$$

where:
M=mass flow rate;
M/ρ=volumetric flow rate;
K=flow coefficient;
$D_o$=orifice diameter;
ρ=density;
p=pressure;
$p_1$=pressure in the lateral; and
$p_2$=pressure in the manifold.

The above equation is solved for D, the orifice diameter:

$$D_o = Q/(K\pi[\rho(p_1-p_2)/8]^{1/2})^{1/2}$$

The approach utilized to calculate orifice plate diameters is to determine which component in the system is at the greatest elevation. The invention does this by examining all user-provided elevations and selecting the system component with the greatest elevation. For this example, assume the effluent is pumped uphill so that the first lateral is above all other laterals and is above the pumping liquid level. Furthermore, all remaining laterals are higher in elevation than the pumping liquid level. The first lateral, being the highest lateral in elevation, does not receive an orifice plate. This is typical because the highest lateral in the system does not receive an orifice plate if the pumping liquid level is lower in elevation than all laterals. If the pumping liquid level is above the laterals, all laterals will receive an orifice plate.

Returning to the example, the pressure and flow rates in the first lateral are calculated using the specified residual pressure, and the pressure loss in manifold segment 1 is calculated. The pressure at the connection of the second lateral with the manifold ($p_2$) is the sum of the residual pressure on the first lateral, the pressure loss in the first lateral, the pressure loss in manifold segment 1, and the elevation difference between the first and second laterals.

Next, the pressure and flow rates in the second lateral are calculated using the specified residual pressure to obtain a flow rate and pressure at the connection of the second lateral with the manifold ($p_1$). The orifice diameter for the second lateral is determined with the above equation by substituting values: Q is the flow rate in the second lateral; $p_1$ is the pressure calculated for the second lateral; and $p_2$ is the pressure in the manifold calculated from the first lateral, manifold segment 1 and the elevation difference.

This approach continues in the same manner for all other laterals. Because direct solution is possible, there is no need to enter into an iterative process where the pressure at the distal orifice in each lateral is varied until pressures match at the lateral and manifold connection. The program uses the residual pressure for each lateral, tracks the pressure losses in the manifold and elevation differences between laterals, and calculates a diameter for the orifice in the orifice plate.

Figure 6:
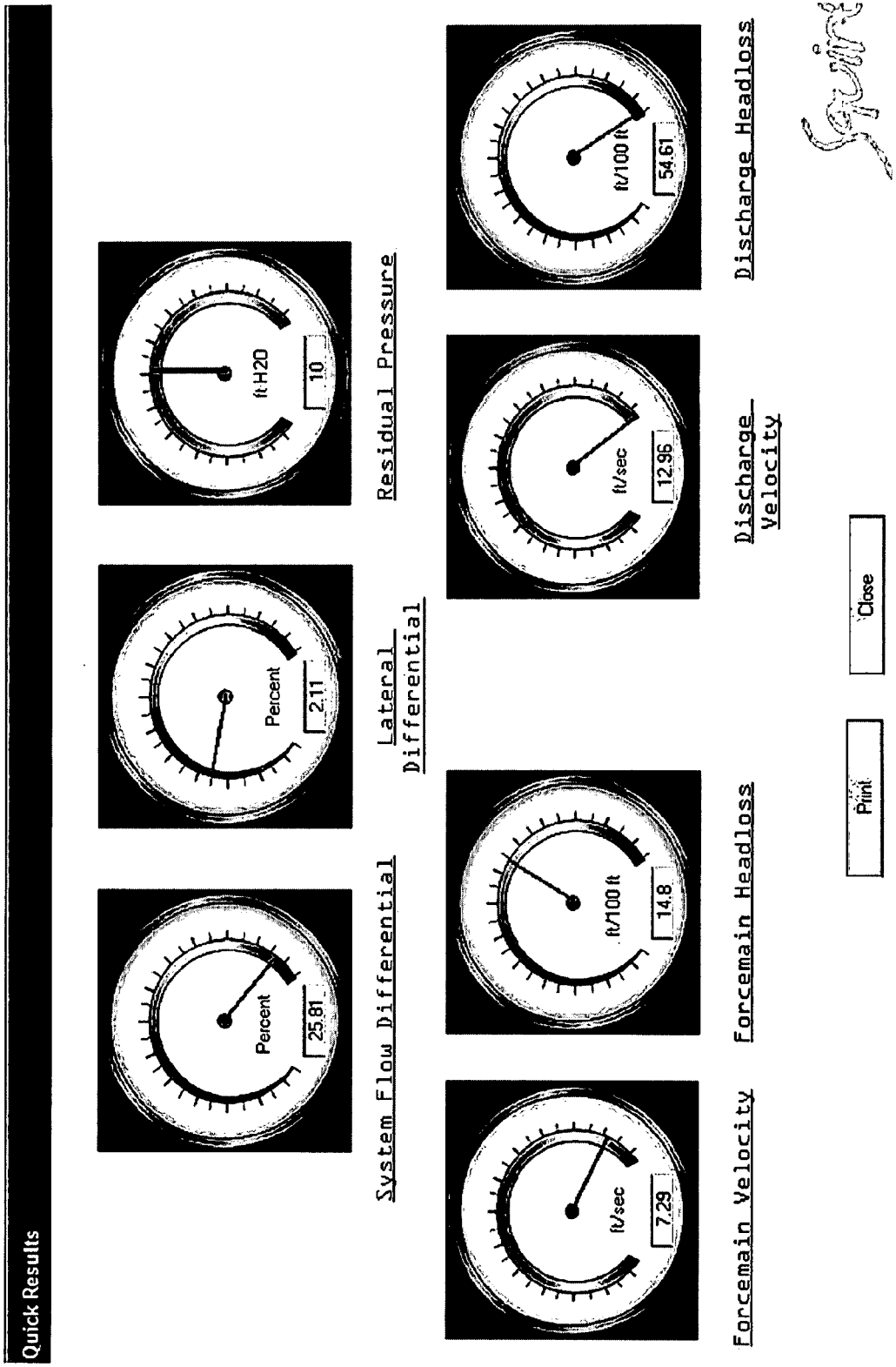
FIG. 6 is a screen shot of the gauge screen of the present invention.

FIG. 6 is an example of a gauge screen reflecting the same data shown in FIG. 4. The system flow differential is shown as 25.81%, the lateral differential (or orifice flow differential) is 2.11%, and the residual pressure is 10.00, as specified by the user on the main screen. The forcemain velocity is 7.29 ft./sec. (feet per second), the forcemain head loss is 14.8 ft./100 ft. of pipe, the discharge assembly velocity is 12.96 ft./sec., and the discharge assembly head loss is 54.61 ft. of pressure loss per 100 ft. of pipe.

The gauge screen provides a convenient way to display graphically the values calculated by the invention and shown in the tabulated results screen so that the user can ascertain quickly and easily whether the main values for the system he has designed are acceptable. If not, the user can go back to the main screen, change one or more values, and pull up the tabulated results and/or gauge screens again to view the results.

In a preferred embodiment, each gauge on the gauges screen has a green zone, a yellow zone and a red zone to indicate to the user whether the calculated values are within acceptable ranges. In the current embodiment, the green/yellow/red zones are preset, but in an alternate embodiment, the user can specify the ranges for the green/yellow/red zones.

In this example, the discharge velocity and discharge head loss are both in the red zone, which means that the engineer may need to change something in his system design (for example, he might use a larger pipe coming out of the pump, which he would do by increasing the diameter of the discharge pipe on the main screen).

Figure 7:
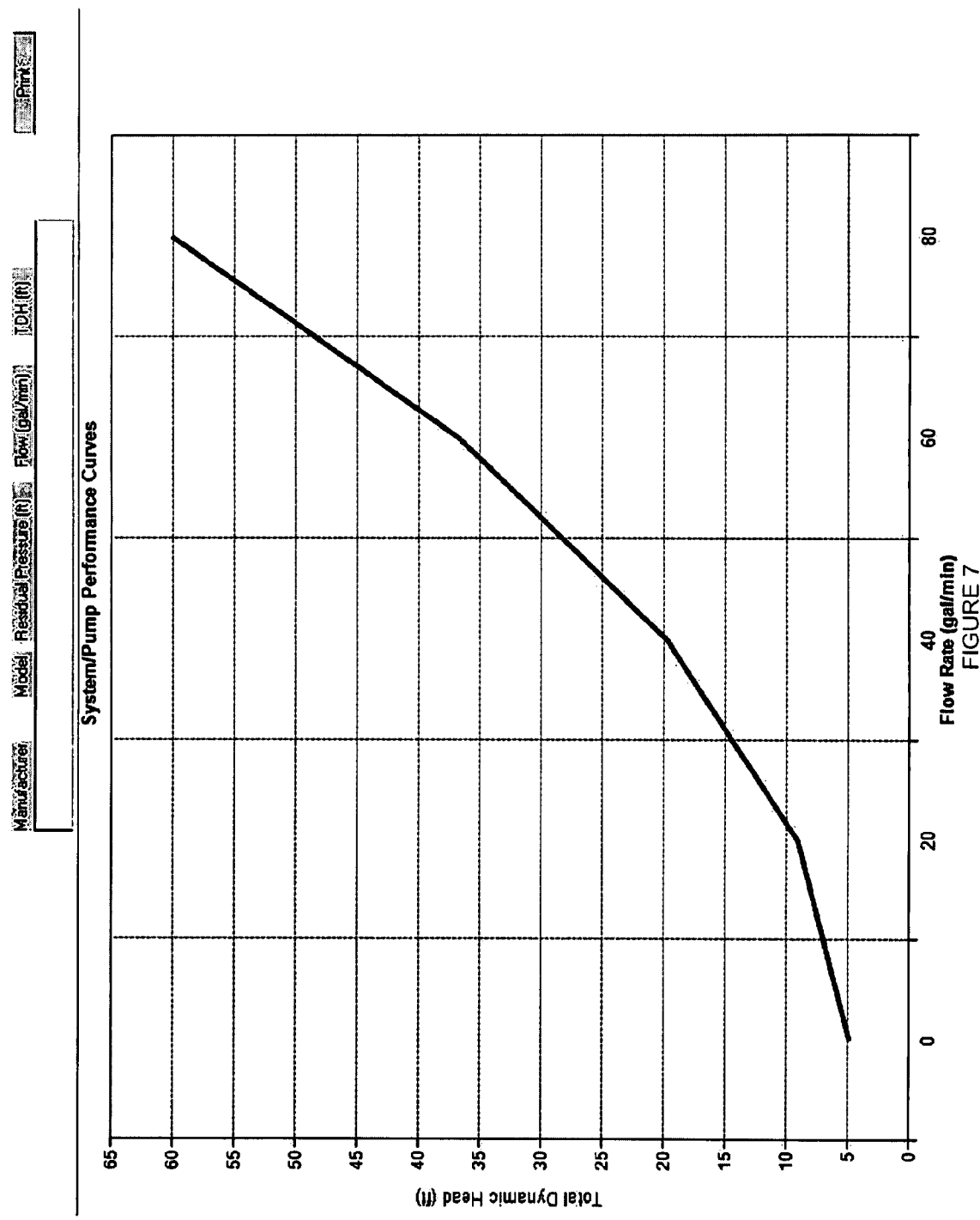
FIG. 7 is a screen shot of a system curve generated by the present invention.

FIG. 7 is a screen shot of the system curve generated by the present invention. A system curve is a graphic representation of pressure versus flow for the system that has been designed using the present invention. Using flow rate as the x axis and pressure as the y axis, the invention takes the overall flow rate and total dynamic head from the tabulated results screen (FIG. 4), which in our example are 71.38 gpm and 40.14 ft. $H_2O$, respectively) and plots a point on the graph. The invention then assumes different values (different than the 10.00 initially entered by the user) for the residual pressure and, in the manner described above, generates flow rates and total dynamic head for the system based on different values for the residual pressure. In this manner, the invention generates a system curve that reflects how the system designed by the user will respond to varying flow and pressure. In a preferred embodiment, the system curve will go from the point that represents the static pressure (i.e., the point at which flow=0) to a certain range (either preset or specified by the user) beyond the point that reflects the specified residual pressure (in this example, that would be a certain range beyond the total dynamic head of 40.14).

Pressurization of the piping network is usually accomplished with an effluent pump, but it may also be accomplished with a dosing siphon. The present invention can be used with either pressurization method, but the pressure-flow curve would be horizontal for a dosing siphon. Each pump has a pump performance curve, which represents the relationship between the flow rate a pump produces and the pressure it produces.

Once the system curve has been generated and plotted, the next step is time to find a pump that will provide a pressure-flow combination that lies somewhere along the system curve and that is as close as practical to the pump's best efficiency point. The best efficiency point is the point at which the pump operates most efficiently; deviation from the best efficiency point will reduce pump life and increase pumping cost.

Figure 8:
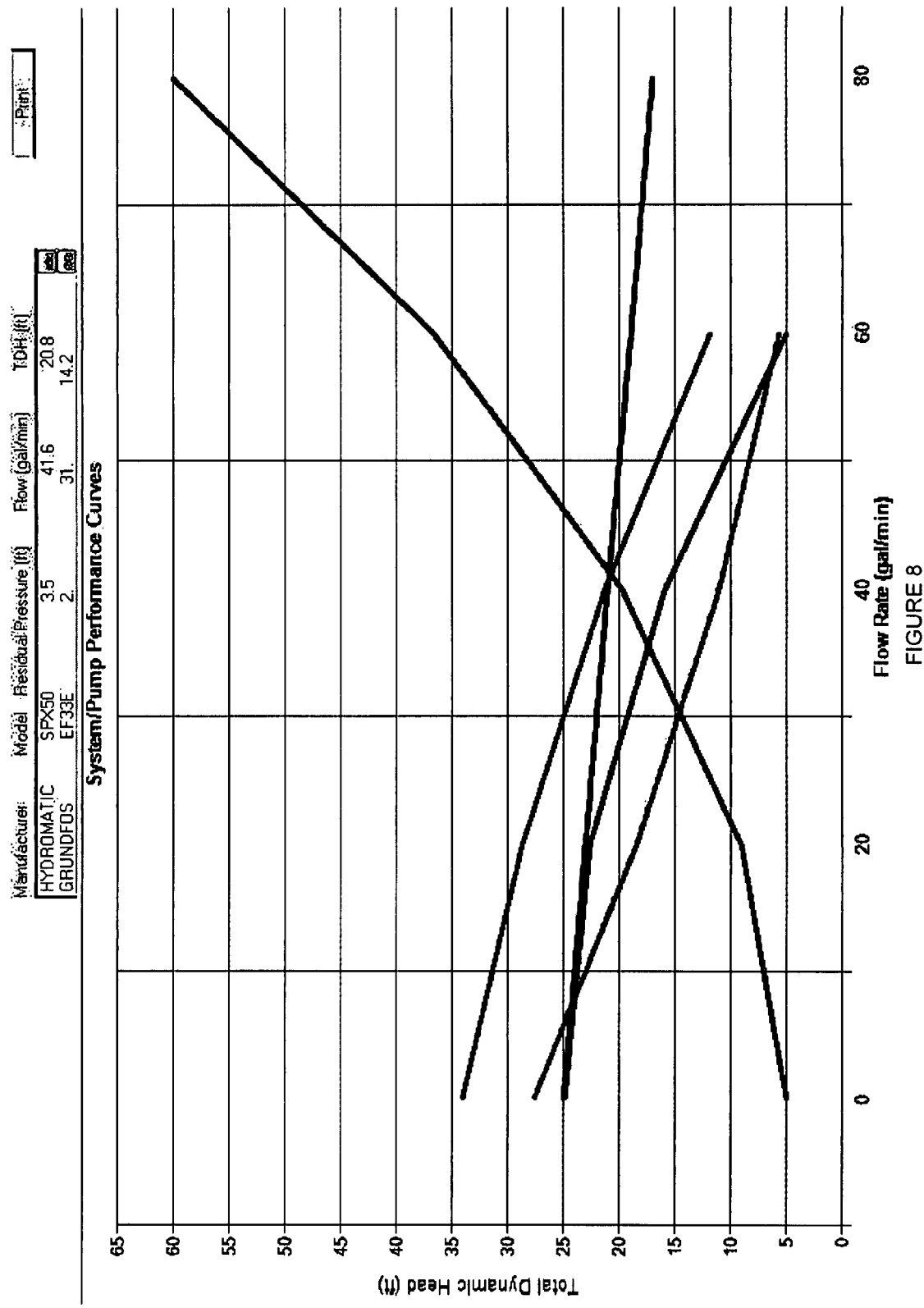
FIG. 8 is a screen shot of a system curve generated by the present invention shown together with pump curves that intersect the system curve.
Figure 9:
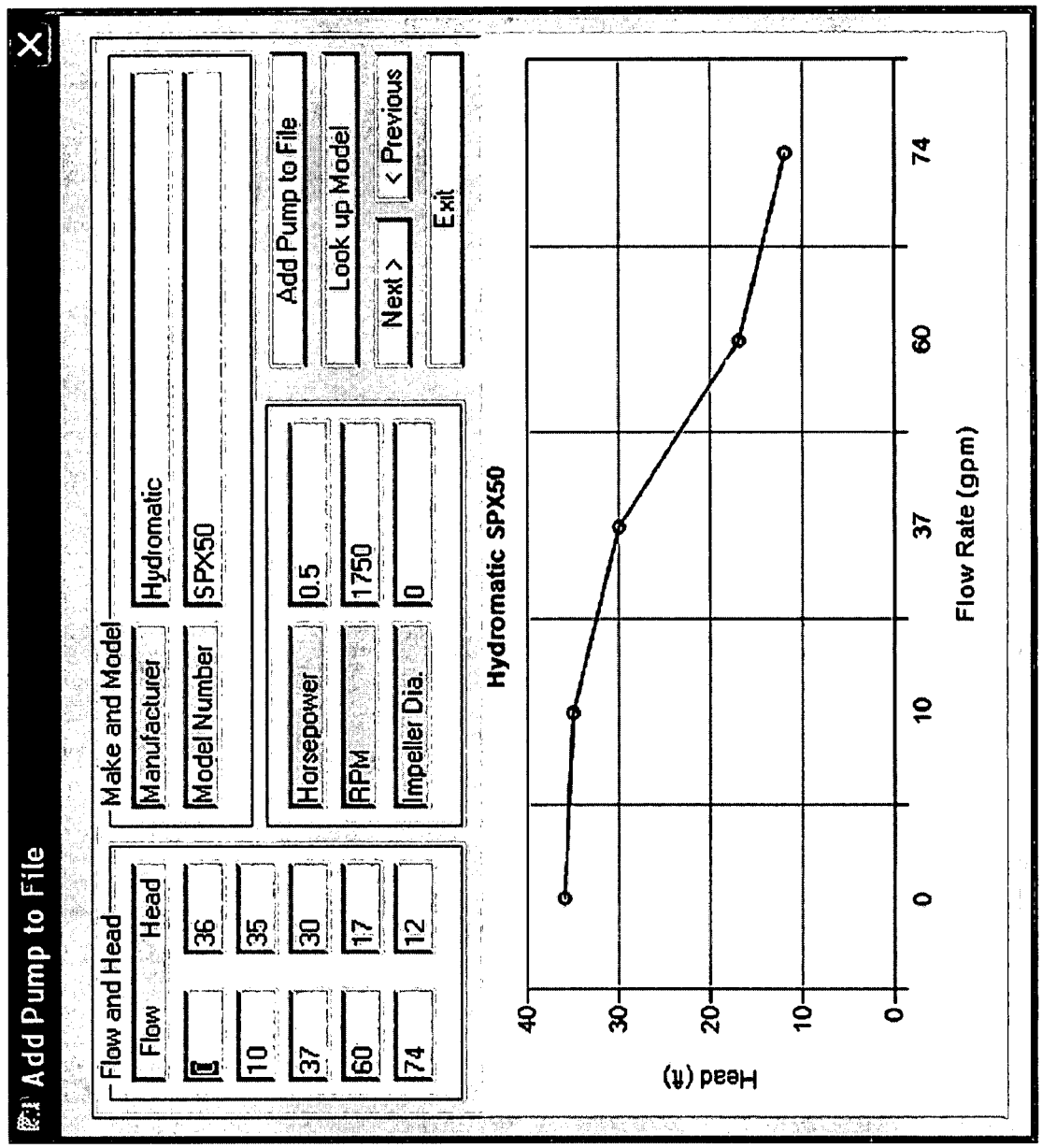
FIG. 9 is a screen shot of the "Add Pump to File" screen of the present invention.

FIG. 8 is a screen shot of the system and pump curves juxtaposed on the same graph. When the user clicks the Auto-Select Pump button from the tool bar, the system automatically selects those pump curves from the pump file that intersect with the system curve based on either the default criteria or other criteria entered by the user. Pumps are added to by the user through the Add Pump to File screen (see FIG. 9). In a preferred embodiment, pump curves are added to the program by importing a .pdf, .bmp, .jpg, .tif or .gif file of the pump curve and allowing the user to use the mouse to define specific points on the curve. Furthermore, pump curves can be generated for various speed pumps by utilizing pump affinity laws [2], which facilitates fast generation of pump curves for the same pump operating at different speeds.

In a preferred embodiment, the invention automatically selects those pump curves for which the system curve falls in between two points to the right and left (relative to the x axis) of the best efficiency point. In a preferred embodiment, the user may specify the tolerance to the right and left, or even up and down (relative to the y axis). For example, the user might specify pumps for which the system curve falls within 25 gpm (x axis) or 10 feet (y axis) of the best efficiency point. If more than one pump fits the user's criteria, it is up to the user to select the pump that is most appropriate for the system, given the overall engineering considerations.

In a preferred embodiment, the user can also manually select pump curves to be plotted on the system-pump curve screen by adding pumps from the pump file to the "Pumps to be Plotted" window (see FIG. 2).

The point at which the system curve intersects with a particular pump curve (also called the "operating point") tells the user what the flow rate and total dynamic head will be for the overall system given a particular pump. Next, the invention calculates the residual pressure for each operating point. The operating point is determined by taking the individual points comprising the system curve and the pump curve and fitting a second order polynomial to them. The polynomials are of the form: $y=Ax^2+Bx+C$, where y is pressure and x is flow rate. A, B, and C are quadratic coefficients computed by the invention. There will be one equation describing the system curve and one equation describing the pump curve.

At the intersection of the curves, x and y for both curves are equal; therefore, to determine the x and y coordinates for the operating point, the two equations are set as equal and solved for x. In the following example, the subscript s refers to the system curve, and the subscript p refers to the pump curve.

For the system curve: $y=A_s x^2+B_s x+C_s$
For the pump curve: $y=A_p x^2+B_p x+C_p$
Set the equations equal: $A_s x^2+B_s x+C_s=A_p x^2+B_p x+C_p$
The formula is then rewritten so that the solution is equal to zero:

$$(As-Ap)x^2+(Bs-Bp)x+(Cs-Cp)=0$$

Each quantity in parentheses is rewritten as a, b, or c for clarity:

$$ax^2+bx+c=0$$

where a=As−Ap; b=Bs−Bp; c=Cs−Cp
The quadratic formula allows for direct solution of x, the flow rate. The quadratic formula is:

$$x=(-b\pm(b^2-4ac)^{1/2})/2a$$

Inserting values provides a direct solution for x, which is the flow rate at the operating point. The pressure at the operating point, y, is determined by substituting the x value into either the system curve or pump curve, $y=A_s x^2+B_s x+C_s$, $y=A_p x^2+B_p x+C_p$. It does not matter which equation is used for the substituted x value because they are equal at the point of intersection.

Next, this data (i.e., the flow rate and pressure at the operating point) is used to calculate the residual pressure required to produce this operating point. The program generates a system curve by incrementing the residual pressure through a series of values beginning at zero. At zero ft. $H_2O$, the flow rate will be zero, and the pressure will be the static pressure (the elevation difference between the pumping liquid level and highest lateral). The system curve is developed with a series of points calculated by varying the residual pressure of the system. Because the operating point has been calculated previously, the program must determine the residual pressure that produces that operating point. The individual data points representing flow and pressure are examined until the first one exceeding the operating point is identified.

Figure 10:
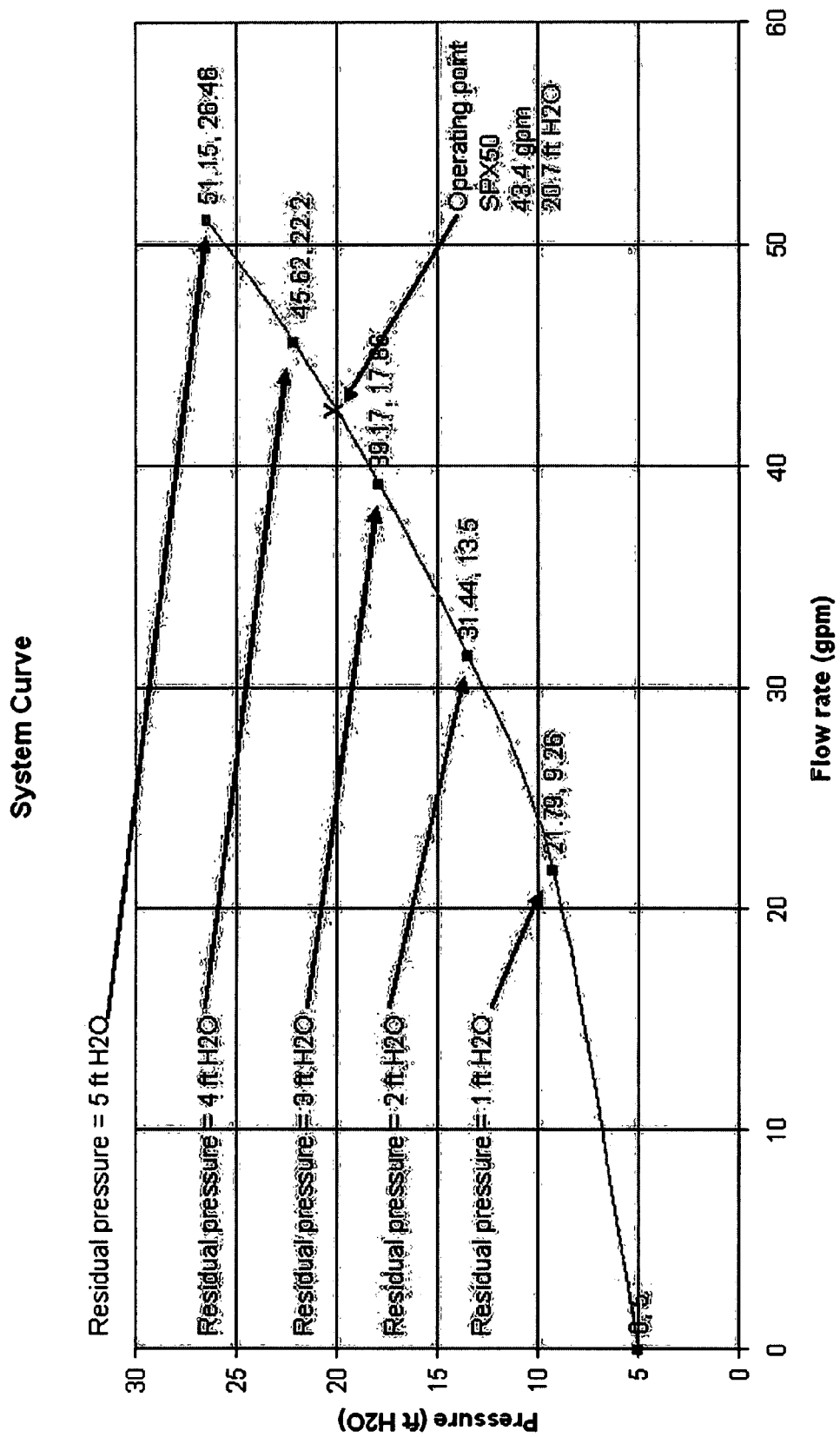
FIG. 10 is an example of a system curve and a pump curve with annotations to facilitate discussion of the calculations performed by the present invention.

FIG. 10 illustrates the calculations described above. In this example, the program will cycle through the data points looking for the first point exceeding (43.4, 20.7). The first point exceeding the operating point is (45.62, 22.20) calculated from a residual pressure of 4 ft. $H_2O$. The program now "brackets" the operating point by looking at 4 ft and 3 ft. Finally, a linear interpolation is used to determine the residual pressure:

$$RP=(RP2-RP1)/(Q2-Q1)*(OPFlow-Q1)+RP1$$

where:
RP≡residual pressure at the operating point;
RP1≡lower residual pressure;
RP2≡upper residual pressure;
Q1≡flow rate at RP1;
Q2≡flow rate at RP2; and
OPFlow≡flow rate at the operating point.

In the example, RP1 is 3; RP2 is 4; Q1 is 39.17; Q2 is 45.62; and OPFlow is 43.4. Substituting values gives a calculated residual pressure of 3.65 ft. $H_2O$, which is rounded to 3.7.

The user needs to know the residual pressure for each operating point so that the user can determine whether the residual pressure meets the regulatory minimum and is sufficient to maintain acceptable pipe flow velocity. If the velocity of the liquid being pumped is too low, there may not be sufficient scour to keep the pipes free of settleable debris. If it is too high, energy is being wasted pumping against friction losses. Furthermore, the user will usually identify a minimum pressure necessary to keep biofilm from obstructing the lateral orifice.

If the intersection point has a residual pressure of 7.8, then the user can go back to the main screen and change the specified residual pressure to 7.8. The tabulated results (and gauge screen) will now match the operating point.

Figure 11:
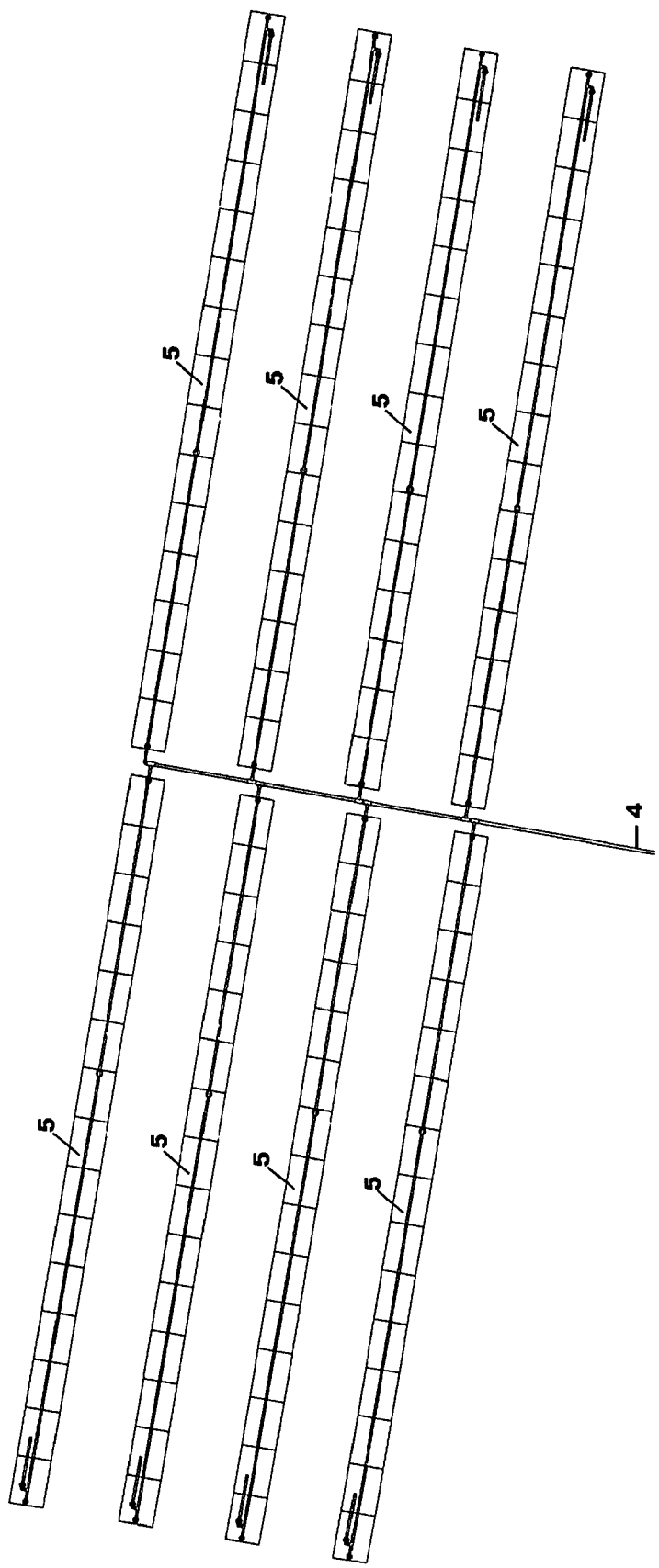
FIG. 11 is an illustration of a central manifold configuration.

The system described in the above example relates to a relatively simple "end" configuration manifold (see FIG. 1), but the present invention can also accommodate central manifold configurations and pitchfork manifold configurations (both symmetric and asymmetric). In the central manifold configuration (see FIG. 11), laterals branch off both sides of the manifold. In the manifold length and diameter window on the main screen (see FIG. 2), odd-numbered manifold segments are made short and of larger diameter than even-numbered manifold segments. The effect of this adjustment is to reduce the pressure loss due to friction between laterals, and the hydraulics behave as if the laterals are directly across from each other.

Figure 12:
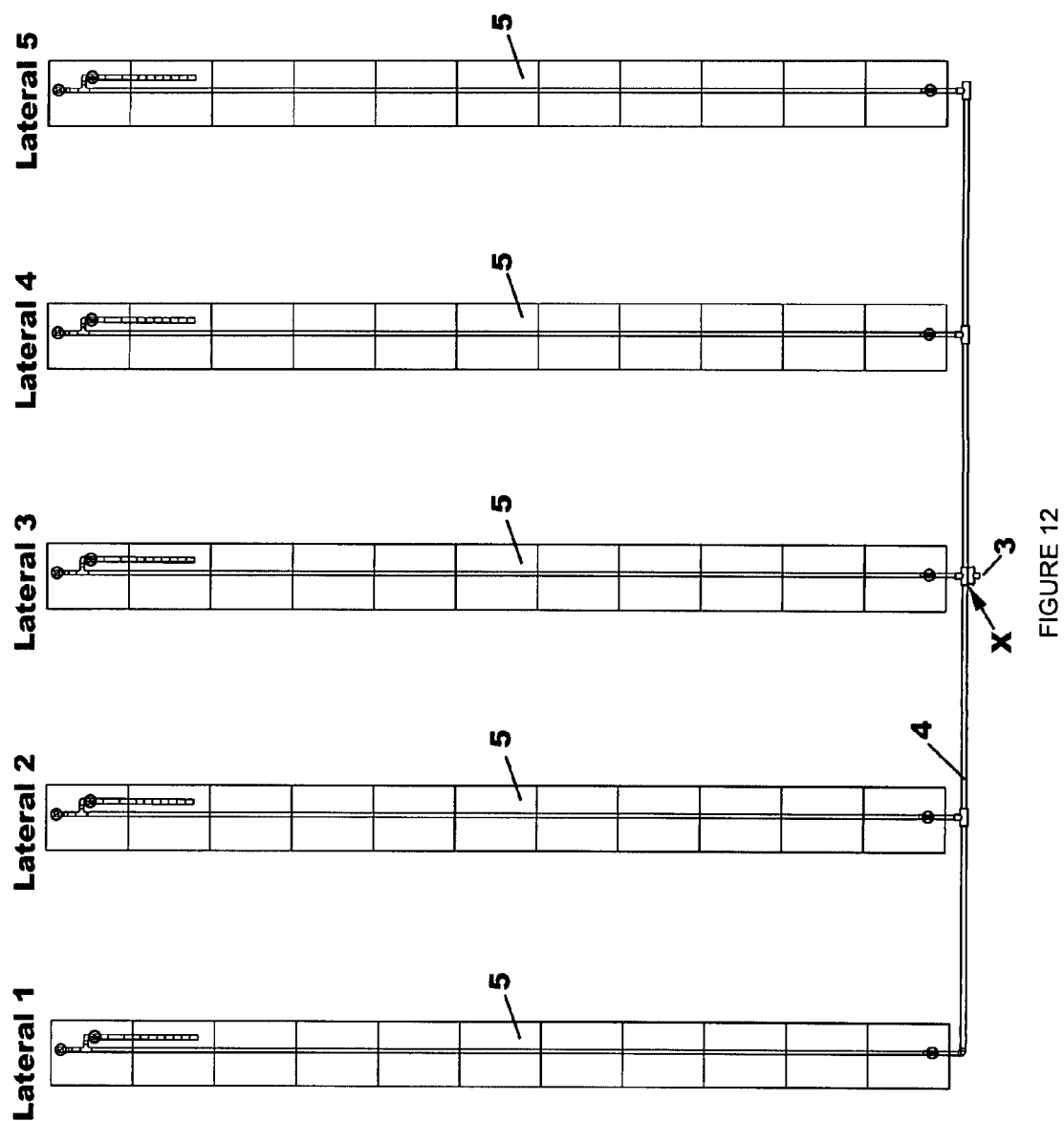
FIG. 12 is an illustration of a symmetric pitchfork manifold configuration.

The pitchfork manifold configuration is similar to the end manifold configuration except that the forcemain connects in the middle of the manifold rather than at the end. FIG. 12 shows a symmetric pitchfork manifold configuration. In this configuration, because the flow to the laterals is split, pressure losses due to pipe friction are reduced, and pressures across all laterals are made more uniform. The pitchfork manifold calculation follow the same calculation routine as the end manifold, except that the system is split into two halves, and each half is analyzed separately and the results compared.

For example, referring to FIG. 12, with residual pressure specified for the distal orifice on lateral 1, the pressure and flow for laterals 1 and 2 are calculated to point X. The values for that point are then held as a constant. Next, the invention assumes the same pressure that was specified for the distal orifice on lateral 1 exists at the distal orifice on lateral 5 and calculates pressure and flow for laterals 4 and 5 back to point X. If the calculated values for point X are not within a specified tolerance of one another, then the invention adjusts the pressure at the distal orifice of lateral 5 until the calculated values for point X are within the specified tolerance of one another (i.e., roughly equal).

Next, the invention assumes a pressure at the distal orifice of lateral 3 and calculates the pressure and flow for lateral 3 back to point X. If this calculated pressure at point X is not within a specified tolerance of the calculated pressure at point X from laterals 1 and 2, on the one hand, and laterals 4 and 5, on the other hand, then the pressure at the distal orifice of lateral 3 is adjusted until the pressure at point X is within the specified tolerance (i.e., roughly equal to the calculated pressure for point X based on calculations from laterals 1 and 2, on the one hand, and laterals 4 and 5, on the other hand).

The invention can also accommodate asymmetric pitchfork manifold configurations, such as that shown in FIG. 13. An asymmetric manifold is one in which there are non-identical-length laterals, orifice spacing and/or orifice diameter on either side of the forcemain connection point. The asymmetrical pitchfork requires a specialized calculation scheme to correctly computer system hydraulics.

In FIG. 13, the lateral lengths vary on either side of the forcemain, but the system has uniform orifice diameters and orifice spacing. Calculation of this system is identical to that for the sloping pitchfork system (i.e., the symmetric pitchfork configuration with laterals of different elevations), with one additional step. Rather than iterating each half of the system (laterals) to match pressures at the forcemain connection, the invention calculates the pressure at each side of the forcemain, selects the lowest pressure based on elevation and frictional pressure losses, and sizes an orifice plate to be installed in the manifold. By installing an orifice plate in the lowest pressure side, the required higher pressure necessary to operate the high pressure side can be supplied without negatively impacting the lower pressure requirement.

In the configuration shown in FIG. 13, side A requires a higher pressure to operate than side B; therefore, the minimum pressure that must be provided by the pump is that required to operate side A. The higher pressure required by side A, however, will cause side B to operate at too high a pressure, and the difference in orifice discharge across the system will be out of compliance with the 10% rule. The invention manages this problem by sizing an orifice plate for the side B manifold that serves to reduce the pressure being supplied to side B. As in the laterals, the orifice plate is installed in a PVC union. The union is installed in the side B manifold between the forcemain connection and the first lateral.

The above description of specific configurations is intended to be illustrative only and not limiting. The present invention is designed to accommodate virtually any manifold configuration that is used in connection with a pressure-dosed drain field. Furthermore, the screen shots provided in connection with this application are intended to be illustrative only and not limiting. The present invention is intended to cover the functionality described herein and is not limited to any particular presentation of that functionality to the user.

The specific equations discussed above are intended to be illustrative of the manner in which certain of the calculations described herein may be performed, but the present invention is not limited to these specific equations.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

REFERENCES

1. Sanks, Robert. Pumping Station Design. $2^{nd}$ ed. Woburn, Mass.: Butterworth and Heinemann, 1998. Ch. 3.
2. ITT. Goulds Pumps. Section A—Centrifugal Pump Fundamentals. A-8 Affinity Laws. http://www.gouldspumps.com/cpf_0010.html.

I claim:

1. A computer-implemented system for designing a pressure-dosed drain field, wherein a user uses the system to design a pressure-dosed drain field, comprising:
   (a) a screen that allows a user to specify length and diameter for pipes that comprise the forcemain and discharge assembly of a pressure-dosed drain field;
   (b) a minor loss screen that calculates minor losses for a pressure-dosed drain field based on fitting selections made by the user;
   (c) a screen that allows the user to specify pumping liquid level and discharge elevation for a pressure-dosed drain field;
   (d) wherein the drain field designed by the user will have a plurality of laterals, wherein the plurality of laterals comprises a first lateral, and wherein the first lateral comprises a distal orifice, a screen that allows the user to select a number of laterals and enter a specified residual pressure for the distal orifice of the first lateral;
   (e) a screen that allows the user to enter or select a coefficient to be used in calculating friction losses in the laterals, manifold, forcemain and pump discharge assembly of a pressure-dosed drain field;
   (f) wherein the manifold comprises segments, wherein the number of manifold segments is determined by the number of laterals entered by the user, wherein each segment has a diameter and length, wherein the laterals are spaced a certain distance apart from one another, and wherein the spacing between manifold segments determines the spacing between the laterals, a screen that allows the user to enter the diameter and length of each manifold segment;
   (g) a pump file that comprises a list of pumps for a pressure-dosed drain field and a window that displays a list of the pumps in the pump file;
   (h) wherein each lateral comprises a plurality of orifices, wherein the space between each orifice on a given lateral defines a lateral segment, wherein each lateral segment has a diameter and length, and wherein each lateral has an elevation, a grid that indicates, for each lateral, orifice diameter, orifice spacing, diameter and length of each lateral segment, and the elevation of the lateral, wherein each of the values displayed in the grid is modifiable by the user; and
   (i) a tabulated results screen that shows, for each lateral, maximum and minimum orifice flow rate, orifice flow differential, lateral flow rate, total lateral head loss, manifold flow rate, manifold head loss, and pressure at the distal orifice of each lateral;
   wherein the system automatically calculates flow differential across the pressure-dosed drain field designed by the user and displays the flow differential on the tabulated results screen;
   wherein the calculation of flow differential across the pressure-dosed drain field is accomplished by:
      (1) calculating an orifice flow in response to a specified residual pressure for a distal orifice on a first lateral;
      wherein there is a first lateral segment between the distal orifice and a second orifice, (2) calculating a segment flow for the first lateral segment, which equals the flow from the distal orifice;
      (3) calculating pressure at the second orifice by summing the specified residual pressure at the distal orifice and pressure loss in the first lateral segment;
      (4) calculating flow at the second orifice;
      (5) calculating flow for subsequent lateral segments by summing the flows from prior orifices;
      (6) calculating pressure at subsequent orifices by summing the specified residual pressure at the distal orifice and pressure losses in all lateral segments between the subsequent orifice and the distal orifice;
   continuing the calculations (6) for subsequent lateral segments until pressure and flow values are generated for the entire length of the lateral;
      (7) calculating a percentage increase in flow from one orifice to the next on a given lateral;
   based on information specified by the user as to manifold segment length and diameter, (8) calculating pressure loss in the manifold and determining manifold pressure at the beginning of a second lateral;
   wherein the second lateral has a distal orifice, assuming that pressure at the distal orifice on the second lateral is the same as the residual pressure on the first lateral, (9) calculating pressure back to the beginning of the second lateral;
   if the calculated pressure at the beginning of the second lateral using a value as a starting point for pressure at the distal orifice on the second lateral is not within a specified range of the pressure at the beginning of the second lateral calculated by using the same value as a starting point for the residual pressure on the first lateral, (10) adjusting pressure at the distal orifice of the second lateral until the calculated pressure at the beginning of the second lateral based on the pressure at the distal orifice of the second lateral is within a specified range of the calculated pressure at the beginning of the second lateral based on the pressure at the distal orifice of the first lateral;
   wherein there is a manifold segment between the second lateral and a third lateral, (11) taking the pressure at the beginning of the second lateral and calculating pressure at the beginning of the third lateral, taking into account head loss for the manifold segment between the second and third laterals;
   wherein the third lateral has a distal orifice, assuming that pressure at the distal orifice on the third lateral is the same as the residual pressure on the first lateral, (12) calculating pressure back to the beginning of the third lateral;
   if the calculated pressure at the beginning of the third lateral using a value as a starting point for pressure at the distal orifice on the third lateral is not within a specified range of the pressure at the beginning of the third lateral calculated by using the same value as a starting point for the residual pressure on the second lateral, (13) adjusting pressure at the distal orifice of the third lateral until the calculated pressure at the beginning of the third lateral based on the pressure at the distal orifice of the third lateral is within a specified range of the calculated pressure at the beginning of the third lateral based on the pressure at the distal orifice of the second lateral;
   continuing the calculations (7)-(13) for all laterals until a pressure has been calculated at the beginning of each lateral in the drain field;
   taking head loss into consideration, calculating pressures for the forcemain and discharge assembly; and
   wherein the drain field has a minimum flow rate orifice and a maximum flow rate orifice, calculating a flow differential across the drain field, wherein the flow differential across the drain field is the difference in flow rates between the minimum flow rate orifice and the maximum flow rate orifice.

2. The system of claim 1, wherein the screen on which the user specifies length and diameter for pipes that comprise the forcemain and discharge assembly, the screen that allows the user to specify pumping liquid level and discharge elevation, the screen that allows the user to select the number of laterals and enter a specified residual pressure for the distal orifice on the first lateral, the screen that allows the user to enter or select a coefficient to be used in calculating friction losses, and the screen that allows the user to select the diameter and length of each manifold segment are all a single main screen.

3. The system of claim 2, wherein the pump file and grid are also displayed on the main screen.

4. The system of claim 1, wherein the flow differential across the pressure-dosed drain field designed by the user is the difference in flow rates between the minimum flow rate orifice and the maximum flow rate orifice across all laterals.

5. The system of claim 1, wherein the system determines whether an air release valve is needed based on discharge elevation, and if so, informs the user of the need for an air release valve.

6. The system of claim 1, wherein a pressure is generated by a pump when it operates at a given flow rate, and wherein each pump included in the pump file has a pump performance curve that reflects the pressure that is generated by the pump at a given flow rate.

7. The system of claim 1, wherein the minor loss screen displays graphically a plurality of fittings used in piping systems, wherein each fitting has a type, wherein the pressure-dosed drain field designed by the user comprises a number of fittings, wherein the user selects on the minor loss screen the type and number of fittings for the forcemain and discharge assembly, wherein the system calculates minor losses for the forcemain and discharge assembly, and wherein the calculated minor losses are displayed on a screen.

8. The system of claim 1, wherein the pressure-dosed drain field designed by the user has an overall flow rate and a total dynamic head, wherein the system calculates the overall flow rate and the total dynamic head, and wherein the overall flow rate and the total dynamic head are reflected on the tabulated results screen.

9. The system of claim 1, wherein the system calculates head loss, velocity and volume for the forcemain, head loss and velocity for the discharge assembly, and dose volume, and wherein these values are reflected on the tabulated results screen.

10. The system of claim 1, wherein the system determines whether an orifice plate is needed for any given lateral based on elevation differences between the laterals, wherein the tabulated results screen includes an orifice plate column, and wherein the system indicates orifice plate diameter required for each lateral in the orifice plate column of the tabulated results screen.

11. The system of claim 1, further comprising a gauge screen, wherein the system calculates system flow differential, lateral differential, residual pressure at the distal orifice of the first lateral, forcemain velocity, forcemain head loss, discharge velocity, and discharge head loss, and wherein these values are shown on the gauge screen in the form of a plurality of gauges.

12. The system of claim 11, wherein each gauge comprises a yellow zone, a green zone and a red zone to indicate to the user whether the calculated values are within acceptable ranges.

13. The system of claim 12, wherein the zones are preset or specified by the user.

14. The system of claim 1, wherein the system generates a system curve, and wherein the system curve is a graphic representation of pressure versus flow for the pressure-dosed drain field designed by the user.

15. The system of claim 1, wherein the pressure-dosed drain field designed by the user has an overall flow rate and a total dynamic head, wherein the system calculates the overall flow rate and the total dynamic head, wherein the overall flow rate and the total dynamic head are reflected on the tabulated results screen, wherein the system plots a point equal to the overall flow rate and total dynamic head from the tabulated results screen on a graph, wherein said point is a point on a system curve, and wherein the system calculates overall flow rates and total dynamic head based on different assumed values for the residual pressure at the distal orifice of the first lateral to generate additional points on the system curve.

16. The system of claim 14 or 15, wherein each pump in the pump file has a best efficiency point, and wherein the system examines the pump file to determine if at least one pump that provides a pressure-flow combination that lies somewhere along the system curve when the pump is within a certain range of its best efficiency point and plots a pump curve for the pump on the same graph as the system curve.

17. The system of claim 16, wherein the range is based on either default criteria or criteria entered by the user.

18. The system of claim 16, wherein the system allows the user to manually select pump curves to be plotted on the same graph as the system curve.

19. The system of claim 16, wherein there is a point at which the system curve intersects with each pump curve, wherein the intersection point is referred to as the operating point, and wherein the system calculates residual pressure at the distal orifice of the first lateral for each operating point.

20. The system of claim 19, wherein the user takes the residual pressure calculated by the system for the operating point and changes the specified residual pressure so that it equals the residual pressure calculated by the system for the operating point, and wherein when the user changes the specified residual pressure so that it equals the residual pressure calculated by the system for the operating point, the values reflected on the tabulated results screen are recalculated so that they are consistent with the operating point.

21. The system of claim 20, further comprising a gauge screen that shows the values reflected on the tabulated results screen in gauge format, wherein when the user changes the specified residual pressure so that it equals the residual pressure calculated by the system for the operating point, the values shown on the gauge screen are recalculated so that they are consistent with the operating point.

22. The system of claim 18, wherein there is a point at which the system curve intersects with each pump curve, wherein the intersection point is referred to as the operating point, and wherein the system calculates residual pressure at the distal orifice of the first lateral for each operating point.

23. The system of claim 22, wherein the user takes the residual pressure calculated by the system for the operating point and changes the specified residual pressure so that it equals the residual pressure calculated by the system for the operating point, and wherein when the user changes the specified residual pressure so that it equals the residual pressure calculated by the system for the operating point, the values reflected on the tabulated results screen are recalculated so that they are consistent with the operating point.

24. The system of claim 23, further comprising a gauge screen that shows the values reflected on the tabulated results screen in gauge format, wherein when the user changes the specified residual pressure so that it equals the residual pressure calculated by the system for the operating point, the values shown on the gauge screen are recalculated so that they are consistent with the operating point.

25. The system of claim 1, wherein the system allows for end manifold configurations, central manifold configurations, and symmetric and asymmetric pitchfork manifold configurations for the pressure-dosed drain field.

26. A computer-implemented method for designing a pressure-dosed drain field, wherein a user uses the method to design a pressure-dosed drain field, comprising:

(a) providing a screen that allows a user to specify length and diameter for pipes that comprise the forcemain and discharge assembly of a pressure-dosed drain field;

(b) providing a minor loss screen that calculates minor losses based on fitting selections made by the user for a pressure-dosed drain field;

(c) providing a screen that allows the user to specify pumping liquid level and discharge elevation for a pressure-dosed drain field;

(d) wherein the drain field designed by the user will have a number of laterals, wherein the number of laterals comprises a first lateral, and wherein the first lateral comprises a distal orifice, providing a screen that allows the user to select the number of laterals and enter a specified residual pressure for the distal orifice of the first lateral;

(e) providing a screen that allows the user to enter or select a coefficient to be used in calculating friction losses in the laterals, manifold, forcemain and pump discharge assembly of a pressure-dosed drain field;

(f) wherein the manifold comprises segments, wherein the number of manifold segments is determined by the number of laterals entered by the user, wherein each segment has a diameter and length, wherein the laterals are spaced a certain distance apart from one another, and wherein the spacing between manifold segments determines the spacing between the laterals, providing a screen that allows the user to enter the diameter and length of each manifold segment;

(g) providing a pump file that comprises a list of pumps for a pressure-dosed drain field and a window that displays a list of the pumps in the pump file;

(h) wherein each lateral comprises a plurality of orifices, wherein the space between each orifice on a given lateral defines a lateral segment, wherein each lateral segment has a diameter and length, and wherein each lateral has an elevation, providing a grid that indicates, for each lateral, orifice diameter, orifice spacing, diameter and length of each lateral segment, and the elevation of the lateral, wherein each of the values displayed in the grid is modifiable by the user;

(i) providing a tabulated results screen that shows, for each lateral, maximum and minimum orifice flow rate, orifice flow differential, lateral flow rate, total lateral head loss, manifold flow rate, manifold head loss, and pressure at the distal orifice of each lateral; and (j) automatically calculating the flow differential across the pressure-dosed drain field designed by the user and displaying the flow differential on the tabulated results screen;

wherein the calculation of flow differential across the pressure-dosed drain field is accomplished by:

(1) calculating an orifice flow in response to a specified residual pressure for a distal orifice on a first lateral;

wherein there is a first lateral segment between the distal orifice and a second orifice, (2) calculating a segment flow for the first lateral segment, which equals the flow from the distal orifice;

(3) calculating pressure at the second orifice by summing the specified residual pressure at the distal orifice and pressure loss in the first lateral segment;

(4) calculating flow at the second orifice;

(5) calculating flow for subsequent lateral segments by summing the flows from prior orifices;

(6) calculating pressure at subsequent orifices by summing the specified residual pressure at the distal orifice and pressure losses in all lateral segments between the subsequent orifice and the distal orifice continuing the calculations (6) for subsequent lateral segments until pressure and flow values are generated for the entire length of the lateral;

(7) calculating a percentage increase in flow from one orifice to the next on a given lateral;

based on information specified by the user as to manifold segment length and diameter, (8) calculating pressure loss in the manifold and determining manifold pressure at the beginning of a second lateral;

wherein the second lateral has a distal orifice, assuming that pressure at the distal orifice on the second lateral is the same as the residual pressure on the first lateral, (9) calculating pressure back to the beginning of the second lateral;

if the calculated pressure at the beginning of the second lateral using a value as a starting point for pressure at the distal orifice on the second lateral is not within a specified range of the pressure at the beginning of the second lateral calculated by using the same value as a starting point for the residual pressure on the first lateral, (10) adjusting pressure at the distal orifice of the second lateral until the calculated pressure at the beginning of the second lateral based on the pressure at the distal orifice of the second lateral is within a specified range of the calculated pressure at the beginning of the second lateral based on the pressure at the distal orifice of the first lateral;

wherein there is a manifold segment between the second lateral and a third lateral, (11) taking the pressure at the beginning of the second lateral and calculating pressure at the beginning of the third lateral, taking into account head loss for the manifold segment between the second and third laterals;

wherein the third lateral has a distal orifice, assuming that pressure at the distal orifice on the third lateral is the same as the residual pressure on the first lateral, (12) calculating pressure back to the beginning of the third lateral;

if the calculated pressure at the beginning of the third lateral using a value as a starting point for pressure at the distal orifice on the third lateral is not within a specified range of the pressure at the beginning of the third lateral calculated by using the same value as a starting point for the residual pressure on the second lateral, (13) adjusting pressure at the distal orifice of the third lateral until the calculated pressure at the beginning of the third lateral based on the pressure at the distal orifice of the third lateral is within a specified range of the calculated pressure at the beginning of the third lateral based on the pressure at the distal orifice of the second lateral;

continuing the calculations (7)-(13) for all laterals until a pressure has been calculated at the beginning of each lateral in the drain field;

taking head loss into consideration, calculating pressures for the forcemain and discharge assembly; and wherein the drain field has a minimum flow rate orifice and a maximum flow rate orifice, calculating a flow differential across the drain field, wherein the flow differential across the drain field is the difference in flow rates between the minimum flow rate orifice and the maximum flow rate orifice.

27. The method of claim 26, wherein the screen on which the user specifies length and diameter for pipes that comprise the forcemain and discharge assembly, the screen that allows the user to specify pumping liquid level and discharge elevation, the screen that allows the user to select the number of laterals and enter a specified residual pressure for the distal orifice on the first lateral, the screen that allows the user to enter or select a coefficient to be used in calculating friction losses, and the screen that allows the user to select the diameter and length of each manifold segment are all a single main screen.

28. The method of claim 27, wherein the pump file and grid are also displayed on the main screen.

29. The method of claim 26, wherein the flow differential across the pressure-dosed drain field designed by the user is the difference in flow rates between the minimum flow rate orifice and the maximum flow rate orifice across all laterals.

30. The method of claim 26, further comprising determining the necessity for an air release valve based on discharge elevation and, if an air release valve is needed, informing the user of the need for an air release valve.

31. The method of claim 26, wherein a pressure is generated by a pump when it operates at a given flow rate, and wherein each pump included in the pump file has a pump performance curve that reflects the pressure that is generated by the pump at a given flow rate.

32. The method of claim 26, wherein the minor loss screen displays graphically a plurality of fittings used in piping systems, wherein each fitting has a type, wherein the pressure-dosed drain field designed by the user comprises a number of fittings, and wherein the user selects on the minor loss screen the type and number of fittings for the forcemain and discharge assembly, further comprising calculating minor losses for the forcemain and discharge assembly and displaying the calculated minor losses on a screen.

33. The method of claim 26, wherein the pressure-dosed drain field designed by the user has an overall flow rate and a total dynamic head, further comprising calculating the overall flow rate and the total dynamic head and including the calculated overall flow rate and total dynamic head on the tabulated results screen.

34. The method of claim 26, her comprising calculating head loss, velocity and volume for the forcemain, head loss and velocity for the discharge assembly, and dose volume and reflecting the calculated head loss, velocity and volume for the forcemain, head loss and velocity for the discharge assembly, and dose volume on the tabulated results screen.

35. The method of claim 26, wherein the tabulated results screen includes an orifice plate column, further comprising determining whether an orifice plate is needed for any given lateral based on elevation differences between the laterals and indicating orifice plate diameter required for each lateral in the orifice plate column of the tabulated results screen.

36. The method of claim 26, further calculating system flow differential, lateral differential, residual pressure at the distal orifice of the first lateral, forcemain velocity, forcemain head loss, discharge velocity, and discharge head loss and showing the calculated system flow differential, lateral differential, residual pressure, forcemain velocity, forcemain head loss, discharge velocity, and discharge head loss on a gauge screen in the form of a plurality of gauges.

37. The method of claim 36, wherein each gauge comprises a yellow zone, a green zone and a red zone to indicate to the user whether the calculated values are within acceptable ranges.

38. The method of claim 37, wherein the zones are preset or specified by the user.

39. The method of claim 27, further comprising generating a system curve that is a graphic representation of pressure versus flow for the pressure-dosed drain field designed by the user.

40. The method of claim 26, wherein the pressure-dosed drain field designed by the user has an overall flow rate and a total dynamic head, further comprising calculating the overall flow rate and the total dynamic head and including the calculated overall flow rate and total dynamic head on the tabulated results screen, plotting a point equal to the overall flow rate and total dynamic head from the tabulated results screen on a graph, wherein said point is a point on a system curve, calculating overall flow rates and total dynamic head based on different assumed values for the residual pressure at the distal orifice of the first lateral, and plotting the calculated overall flow rates and total dynamic head based on the different assumed values for the residual pressure at the distal orifice of the first lateral as additional points on the system curve.

41. The method of claim 39 or 40, wherein each pump in the pump file has a best efficiency point, further comprising examining the pump file to determine if at least one pump that provides a pressure-flow combination that lies somewhere along the system curve when the pump is within a certain range of its best efficiency point and plotting a pump curve for the pump on the same graph as the system curve.

42. The method of claim 41, wherein the range is based on either default criteria or criteria entered by the user.

43. The method of claim 41, wherein the user manually selects pump curves to be plotted on the same graph as the system curve.

44. The method of claim 41, wherein there is a point at which the system curve intersects with each pump curve, and wherein the intersection point is referred to as the operating point, further comprising calculating residual pressure at the distal orifice of the first lateral for each operating point.

45. The method of claim 44, wherein the user takes the calculated residual pressure for the operating point and changes the specified residual pressure so that it equals the calculated residual pressure for the operating point, further comprising recalculating the values reflected on the tabulated results screen so that they are consistent with the operating point.

46. The method of claim 45, further comprising providing a gauge screen that shows the values reflected on the tabulated results screen in gauge format and recalculating the values shown on the gauge screen so that they are consistent with the operating point.

47. The method of claim 43, wherein there is a point at which the system curve intersects with each pump curve, and wherein the intersection point is referred to as the operating point, further comprising calculating residual pressure at the distal orifice of the first lateral for each operating point.

48. The method of claim 47, wherein the user takes the calculated residual pressure for the operating point and changes the specified residual pressure so that it equals the calculated residual pressure for the operating point, further comprising recalculating the values reflected on the tabulated results screen so that they are consistent with the operating point.

49. The method of claim 48, further comprising providing a gauge screen that shows the values reflected on the tabulated results screen in gauge format and recalculating the values shown on the gauge screen so that they are consistent with the operating point.

50. The method of claim 26, wherein the method allows for end manifold configurations, central manifold configurations, and symmetric and asymmetric pitchfork manifold configurations for the pressure-dosed drain field.

* * * * *